United States Patent [19]

Jones

[11] Patent Number: 4,685,307
[45] Date of Patent: Aug. 11, 1987

[54] RESIDENTIAL HEATING, COOLING AND ENERGY MANAGEMENT SYSTEM

[75] Inventor: Richard D. Jones, Springfield, Va.

[73] Assignee: UHR Corporation, Alexandria, Va.

[21] Appl. No.: 889,512

[22] Filed: Jul. 25, 1986

Related U.S. Application Data

[62] Division of Ser. No. 635,140, Jul. 27, 1984, Pat. No. 4,645,908.

[51] Int. Cl.⁴ .............................................. F25B 13/00
[52] U.S. Cl. ........................................ 62/160; 62/180; 62/238.7
[58] Field of Search ................... 62/238.7, 238.6, 238.1, 62/180, 160, 181, 185, 201, 430, 434, 435, 436; 237/2 B

[56] References Cited

U.S. PATENT DOCUMENTS

| | | | |
|---|---|---|---|
| 3,188,829 | 6/1965 | Siewert et al. | 62/238.6 X |
| 4,012,920 | 3/1977 | Kirschbaun | 62/238.7 X |
| 4,373,354 | 2/1983 | Sawyer | 62/238.6 |
| 4,399,664 | 8/1983 | Derosier | 62/238.7 |
| 4,420,947 | 12/1983 | Yoshino | 62/238.4 |

FOREIGN PATENT DOCUMENTS 0134015  3/1985  European Pat. Off. ........... 62/238.7

Primary Examiner—Harry Tanner
Attorney, Agent, or Firm—Walter C. Farley

[57] ABSTRACT

A residential HVAC system includes a heat pump having a compressor arranged to heat a domestic hot water vessel and to heat or cool a storage vessel which is connected to a heat exchanger within the residence. Temperature sensors are provided at critical locations throughout the system and current and voltage sensors are coupled to the power lines feeding the residence. A microprocessor controls the operation of the compressor and other components of the heat pump system in response to measured temperatures, in response to the level of energy supplied to the residence and in response to the existence of on- or off-peak time intervals to operate the compressor and/or resistive heating elements to condition the hot water and storage vessels for subsequent use and to control an interior fan to condition the space. Operation of the compressor is controlled during on-peak intervals as a function of the resident's life style as reflected in power usage and requested comfort level.

9 Claims, 36 Drawing Figures

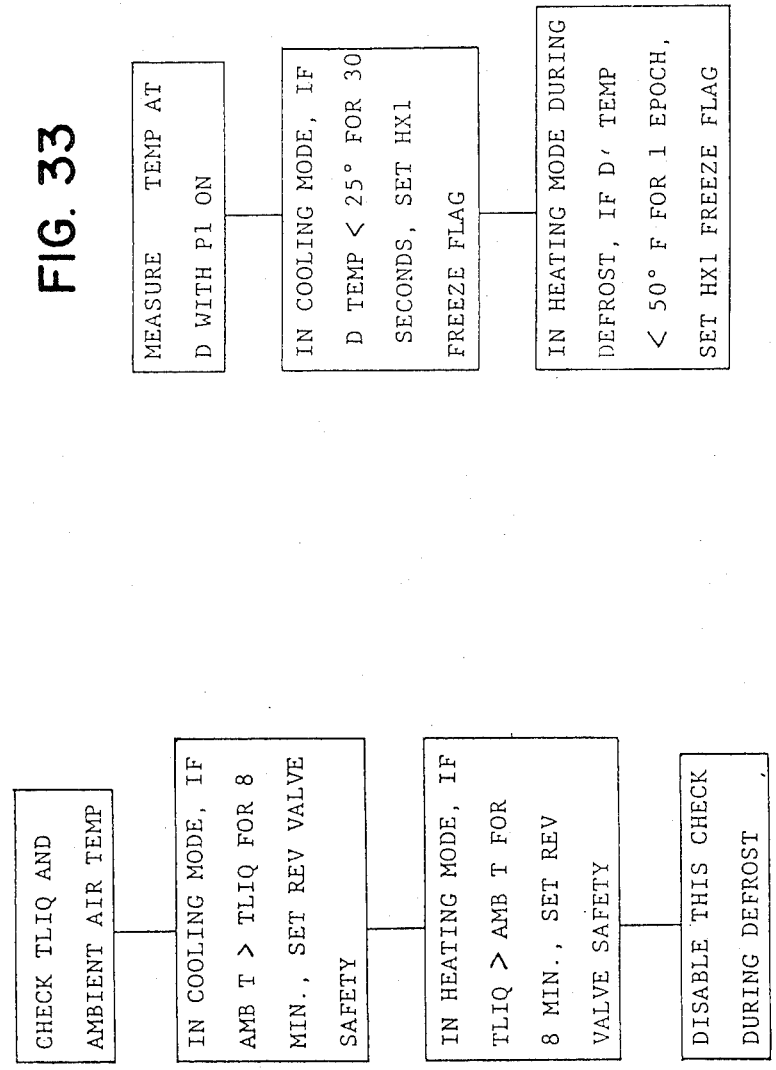

RESIDENTIAL HEATING, COOLING AND ENERGY MANAGEMENT SYSTEM

This application is a division of copending Ser. No. 635,140 filed July 27, 1984, U.S. Pat. No. 4,645,908.

This invention relates to the field of residential heating, ventilating and air conditioning (HVAC) and, more specifically, to a home HVAC system which is integrated with energy use management for the home.

BACKGROUND OF THE INVENTION

It is being recognized that the increasing cost of energy is not a temporary or cyclical phenomenon but a continuing one. While there may be fluctuations from time to time, it is a fact that non-renewable energy sources are being depleted at a rapid rate. As the cheaper energy sources disappear, more expensive sources will take their place, continuing the cost increases to the consumer and also to the energy suppliers, i.e., the utilities. It is therefore no longer logical to use the kinds of rate structures which have been customary in which a user was "rewarded" for volume use of energy. In the case of electrical energy, for example, if there are large fluctuations of energy use the supplying utility must either build enough generating capacity to supply the peak kilowatt energy (KWE) demands or must buy energy from another utility. Because those demand peaks often occur at the same time in nearby utility networks it is not always possible to buy it and, even if it is available, it is always more costly.

As the average level of energy usage increases, the peaks generally increase more, thus placing the utilities in the position of having to make large capital investments for generating plants. Since it is highly desirable to avoid this, it follows that steps need be taken to even out the peaks and valleys of demand, particularly to decrease energy usage during peak intervals. It is, of course, also quite important to maximize the efficiency of each HVAC system in the network.

Residential electrical energy usage is a major contributor to the peak demand in many areas. Although one residence considered alone may not have a meaningful impact on the KWE demand curves, it is well established that residential users follow certain patterns which are statisically very significant and that those patterns in any given area have a major effect on KWE demand in that area. In an effort to make use of this knowledge, utilities in many regions have instituted a rate structure which is based on the maximum energy usage by a residence during sample intervals spaced through the peak demand times. A common technique is to monitor the usage for one-half hour intervals between each hour and half hour (e.g., 10:00 and 10:30) during the peak usage time of, e.g., 9 a.m. and 9 p.m. While this is a step in the right direction, it is difficult for most homeowners to make effective use of such a rate structure because there is no practical way for them to know when power is being used by their residences or in what amounts.

BRIEF SUMMARY OF THE INVENTION

Accordingly, an object of the present invention is to provide a residential HVAC system which is highly efficient.

A further object is to provide a residential heat pump HVAC system which includes a control system for monitoring total electrical energy being used by the residence and for controlling the operation of the heating and cooling equipment so that maximum KVA usage during peak demand times can be minimized.

Another object is to provide a computer control for an HVAC heat pump system having software for controlling the heating and cooling functions to satisfy comfort and energy use criteria.

In order that the manner in which the foregoing and other objects are attained in accordance with the invention can be understood in detail, a particularly advantageous embodiment thereof will be described with reference to the accompanying drawings, which form a part of this specification, and wherein:

FIGS. 7-36 are diagrams illustrating the functions and criteria in the software modules for controlling a system in accordance with the present invention.

Briefly described, the invention includes a method for controlling a space conditioning system to modify the temperature of a space within a structure where the structure is supplied with electrical energy during intervals of on-peak and off-peak electrical usage and wherein the system includes a thermal storage mass, means for selectively transferring heat between the storage mass and the ambient atmosphere, means for selectively transferring heat between the storage mass and the space, and means for monitoring the electrical energy being supplied to the structure. The method includes the steps of establishing a set point temperature at which the space is to be maintained, establishing a temperature range within which the storage mass is to be maintained to permit conditioning of the space using the storage mass, conditioning the storage mass during periods of off-peak usage by transferring heat between the storage mass and the ambient atmosphere, investigating the temperature of the space, and conditioning the space by transferring heat between the storage mass and the space when the temperature of the space differs from the set point by a selected amount without regard to whether the space conditioning time is during an on-peak or off-peak interval.

In another aspect, the invention includes a system for temperature conditioning the interior of a residence comprising the combination of first and second refrigerant-to-fluid heat exchangers located within the residence and having separate refrigerant and fluid paths therein in heat exchange relationship with each other, and a refrigerant circuit including a refrigerant-to-air heat exchanger located outside of the residence and having a refrigerant path in heat exchange relationship with ambient air, a refrigerant compressor and an expansion device within the residence. The refrigerant paths of the refrigerant-to-air heat exchanger, the expansion device and the refrigerant paths of the first and second refrigerant-to-fluid heat exchangers are connected in operative relationship to transfer heat between ambient air and the fluids in the refrigerant-to-fluid heat exchangers. The system further includes a first fluid circuit including a first fluid-to-air heat exchanger and a first fluid storage tank, the fluid path of the first refrigerant-to-fluid heat exchanger, the first storage tank and the fluid path of the fluid-to-air heat exchanger being connected in a closed loop series path. A second fluid circuit includes a second fluid storage tank connected to the fluid path of the second refrigerant-to-fluid heat exchanger in series relationship whereby the compressor can be operated to heat the fluid in the second tank and condition the temperature of the fluid in the first tank which can then be used to condition the interior of the residence.

DETAILED DESCRIPTION OF THE INVENTION

Figure 1:
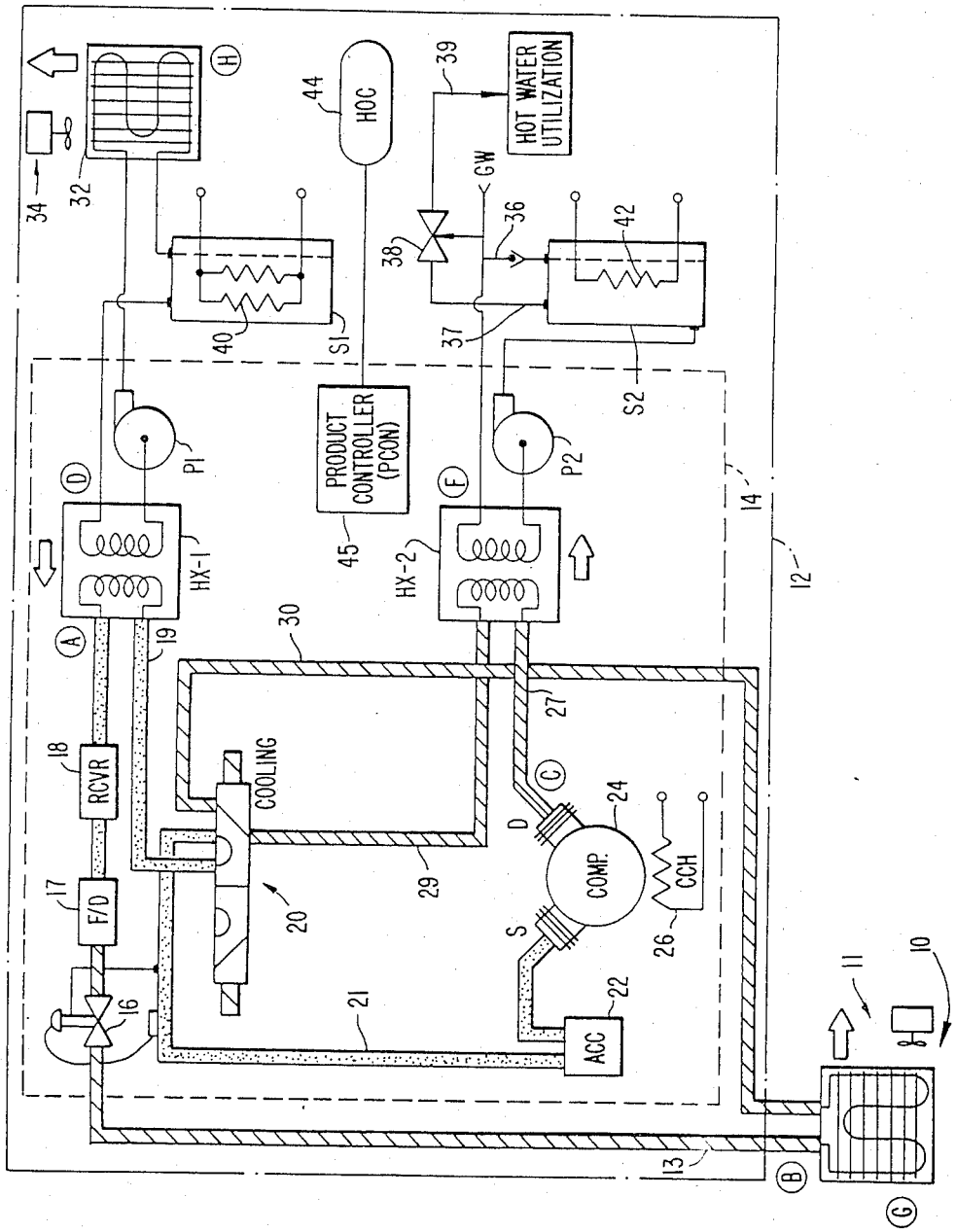
FIG. 1 is a schematic diagram, partly in block form, of a system in accordance with the present invention.

The system is shown in FIG. 1 with the reversing valve in position for cooling of an interior space and will first be described in this mode. The system, which can be described as an air-to-water-to-air system, includes an outdoor air coil indicated generally at 10 having a fan 11 for drawing outdoor air through and across the coil. Coil 10 is a conventional refrigerant-to-air heat exchanger of a type manufactured by several companies in the HVAC field. In the present system, it is positioned physically and thermodynamically in the usual position occupied by this component.

The structure to be heated and cooled by the system is indicated by a dot-dash line 12 which can be regarded as schematically indicating the boundaries of a residence. One end of coil 10 is connected to a conduit 13 which extends into the structure and into a module which will be referred to as the generator module 14, all components within this module being physically located within a single housing in the present system, somewhat contrary to prior practice. Conduit 13 is connected to a thermostatic expansion valve 16 which is also a conventional device of a type manufactured by several companies in the HVAC field. In series sequence following the expansion valve are a filter-dryer unit 17, a receiver 18 and one end of the refrigerant side of a refrigerant-to-water heat exchanger HX-1. The other end of the refrigerant portion of exchanger HX-1 is connected through a conduit 19 to a 2-position, 4-way reversing valve indicated generally it 20, valve 20 being of a conventional type available from several companies in the field. Valve 20 is preferably a solenoid actuated valve, the control for which will be discussed subsequently.

Valve 20 is shown in the position occupied in the cooling mode in which conduit 19 is connected through the valve to a conduit 21 which leads to an accumulator 22, and from the other side of the accumulator to the suction side of a conventional compressor 24. It will be observed that compressor 24 is in a position in the refrigerant system which can be regarded as normal from a thermodynamic standpoint. However, its physical location is unusual in that the compressor is disposed within the container 14 in the conditioned space 12 itself. As is customary in this field, the compressor is provided with a crankcase heater 26. The pressure side of compressor 24 is connected through a conduit 27 to the refrigerant side of a refrigerant-to-water heat exchanger HX-2, the other side of which is connected through a conduit 29 to the reversing valve. Again, in the cooling mode, conduit 29 is coupled to a conduit 30 which leads to the other side of the outdoor air coil.

As will be readily recognized from the schematic illustration of valve 20, in the heating mode conduit 29 is connected to conduit 19 and conduit 21 is connected to conduit 30.

The water circuit connected to the water side of exchanger HX-1 includes a series interconnection of a pump P1, an indoor coil indicated generally at 32 and a heating/cooling water storage container S1, these components being interconnected by suitable piping. Indoor coil 32 is provided with a fan or blower 34 by which return air is drawn through and caused to pass over the coils of exchanger 32 for suitable water-to-air heat exchange.. The water side of exchanger HX-2 includes a pump P2 which is connected to draw water through the water side of exchanger HX-2 and deliver water to the lowest portion of a domestic hot water storage container S2. The other side of the water coil of exchanger HX-2 is connected to a ground water supply and to a conduit 36 which extends to the bottom of container S2. At the upper end of container S2 is a hot water outlet 37 which is connected through a tempering valve 38 to the hot water supply conduit 39. It will be observed that conduit 36 is also connected to the tempering valve so that the valve can provide an appropriate mixture of hot and ground water for providing a hot water output of a desired temperature.

Containers S1 and S2 are also supplied with resistive heating elements 40 and 42, schematically illustrated in FIG. 1, so that in appropriate circumstances additional energy can be supplied to the system to heat the water in either or both of the containers. Element 40 is preferably two elements in parallel as illustrated.

It will be observed that exchanger HX-2 is in a position at the output or pressure side of compressor 24 so that it can always be supplied with refrigerant at an elevated temperature, providing the capacity for heating the water in container S2 in either the heating or cooling mode, or, if desired, when the system is not being used for either heating or cooling. Each of containers S1 and S2 is preferably a 120 gallon domestic hot water tank, container S1 being supplied with two 4.5 kW heating elements and container S2 being supplied with one 4.5 kW element.

In the present system, as distinguished from prior systems, because of the positioning of the components in relationship to each other and because of the control functions hereinafter described, the system permits the size of exchanger HX-2 to be increased so as to be equivalent with exchanger HX-1. This will allow the refrigerant to fully condense in HX-2 without causing extraordinary efficiency losses. This feature gives the system the ability to produce domestic hot water in container S2 at a minimum temperature of between about 120° and about 130° F. year-round, using the outdoor ambient air or the water stored in container S1 as the source of evaporator energy. It is therefore possible to supply hot water even when the space within structure 12 is not calling for either heating or cooling, and the hot water can be supplied by the system with an instantaneous operating efficiency greater than one.

As previously suggested, container S1 acts as a reservoir of cold water in the cooling mode and a reservoir of hot water in the heating mode. The water in this container can be cooled only by the heat pump system but it can be heated by either the heat pump or by the conventional resistive heating methods. As will be explained, the resistive elements will be used at full strength by the system, when required, during off-peak demand times and will be used during "on-peak" times, at a lesser rate, only when required to maintain a minimum space condition.

On the other hand, container S2 and its associated circuit is the portion of the system which contains potable domestic water which can be heated by either the heat pump or the resistive element but cannot be mechanically cooled by any means.

It will also be observed that fan coil 32 and its associated fan 34 is illustrated as being the only exchanger delivering heat to or extracting heat from the controlled space. However, in the system described, additional fan coils can be connected in parallel relationship with coil 32, each having its own fan. This is a particular advantage of the present system because zoning of a single-family dwelling with plural fan coils in prior systems has previously required a plurality of refrigeration circuits, one for each zone.

The system also includes a plurality of sensors which supply various analog inputs to the control system, these sensors and their approximate locations being indicated by circled capital letters adjacent various positions in the schematic diagram of FIG. 1.

Sensor A provides a signal representative of the temperature of the liquid refrigerant close to the water input end of heat exchanger HX-1, this temperature being identified by the mnemonic THX1. This temperature is indicative of the leaving liquid temperature in the heating mode and the evaporating temperature in the cooling mode.

Sensor B provides an analog input representative of the outdoor liquid temperature (TLIQ) by measuring the temperature of the liquid refrigerant on the liquid manifold of the outdoor coil. This is representative of the evaporating temperature in the heating mode and the leaving liquid temperature in the cooling mode.

Sensor C represents the compressor discharge temperature (TDIS) and measures the temperature of the high pressure refrigerant gas as it discharges from the compressor during those times when the compressor is in operation.

Sensor D provides a measure of the storage water temperature (TSTO) by measuring the temperature of the water entering heat exchanger HX-1. This is representative of the temperature of the storage water at the top of tank S1.

Sensor F is a domestic hot water temperature signal (TDHW), this sensor measuring the temperature of the water entering the water side of HX-2.

Sensor G measures the temperature of the ambient air (TAMB) by sensing that temperature at the inlet side of exchanger 10.

Sensor H provides a measure of the temperature of the controlled space by measuring the return air temperature (TRETA), this temperature being indicative of the average air temperature in the space during fan operation and, at that time, can be used for thermostat function purposes. Because of the fact that sensor H is positioned at the inlet to exchanger 34, the temperature measured by sensor H can be regarded as a valid, usable temperature only when fan 34 is running and has been running for a period of time. At other times, the temperature at sensor H could vary over a wide range and will be disregarded. An important advantage is obtained by positioning sensor H at this location because return air is supplied to the sensor from various portions of the structure 12 and is mixed, thus exposing sensor H to a temperature which is much more representative of the whole structure than can be obtained with one thermostat, no matter how carefully one determines the location of that thermostat. An additional benefit is that the control unit for the present system can be located in any region of the house as determined by considerations of esthetics, convenience or other factors and is no longer limited to locations suitable for the temperature sensing element.

In addition to those illustrated in FIG. 1, the system of the present invention employs inputs from current and voltage sensors which are coupled to the power supply to the space 12. It should be understood that the currents and voltages being measured in this connection are not only the voltages and currents of the air conditioning system itself, but rather are the total current and voltage quantities being supplied to the entire residence. By measuring these quantities and employing them appropriately in conjunction with operation of the AC system, the most efficient energy management conditions can be arrived at.

Other inputs to the system will be described hereinafter.

The activity of the compressor, pumps and fans is controlled by a controller which can be incorporated physically in a product controller 45, which operates in conjunction with a homeowner's console (HOC) 44 which is shown as being within residence 12. Controller 45 is housed in module 14 and is connected by suitable wiring to the system sensors mentioned above and to the components to be actuated but that wiring has been omitted from FIG. 1 for simplicity.

Console 44 can take various forms but advantageously includes certain controls which are to be adjustable by the homeowner to select modes, times and temperatures which are to be maintained in the residence and displays to inform him or her of conditions in the system. These constitute the mode of communication between the system controller and the residence occupant.

Before entering into a detailed discussion of the controller and its programming, some basic concepts of system operation will be discussed. The first concept is that of the "flywheel" effect which can be achieved with a storage tank system arranged as shown in FIG. 1. It will be observed that both the domestic hot water (DHW) storage tank S2 and storage tank S1 are on the "load" side of the compressor which is an unusual arrangement. Normally, only a heat exchanger such as HX-1 or exchanger 32 (depending on the type of system) would be on the load side of the compressor and some storage means, if it exists, would be on the source/sink side. Having the storage S1 on the load side along with S2 permits the compressor to heat the water in tank S2 whether the system mode is heating or cooling and to either heat or cool the water in tank S1, as required.

A second concept involves the flywheel effect but also depends upon the monitoring of the power supplied to the residence. As mentioned above, there are certain hours of the day which are peak hours of demand for utilities supplying electrical energy and each utility must build generating capacity and plan alternative energy sources based on that peak. At the present time, many utilities charge rates which are higher during on-peak hours than during off-peak hours and it is quite clear that such rate structures will be in effect in all metropolitan areas in the near future. The rate structures are arranged so that the power consumed by each dwelling is repeatedly measured over set intervals of time, e.g., over a 0.5 hour period, and the maximum KWH measurement is used as a basis for establishing the rate to be charged for that dwelling, i.e., both usage and demand can be involved.

It is necessary, of course, for the occupants of a dwelling to use various electrical appliances in the dwelling (other than the heating/cooling system) at certain hours during the on-peak periods to cook, read, refrigerate, clean and perform other tasks. It would be economically very desirable if the heating/cooling load could be imposed only at times when power usage attributable to other appliances was at a minimum, or during off-peak hours, or both. This would not only reduce the cost of electricity for the homeowner but would be beneficial to the utility because of the decreased need to build additional generating capacity.

Normally such an arrangement is not possible without severely altering the homeowner's lifestyle. However, with the present system it is possible to monitor energy usage of the entire dwelling operate the heating/cooling system (and in particular the compressor and/or resistive heaters) at times when the remainder of the house load is lowest. This is also possible because the deposit of or extraction of energy to or from tanks S1 and S2 can be performed essentially independently of the instantaneous space-conditioning demands of the dwelling and of the operation of fan 34. Thus, even when resistive elements 40, 42 must be used because of extremely cold conditions, those elements can be operated at the most advantageous times from an energy use distribution point of view. The console 44 is also provided with an "ON PEAK" indicator light and an audible signal which permits the occupant to contribute to his savings by avoiding the use of high current appliances when possible.

While the above is a somewhat simplified treatment of the issues, it is believed that the basis for them and the system implementation will be more clear from the following.

Figure 2:
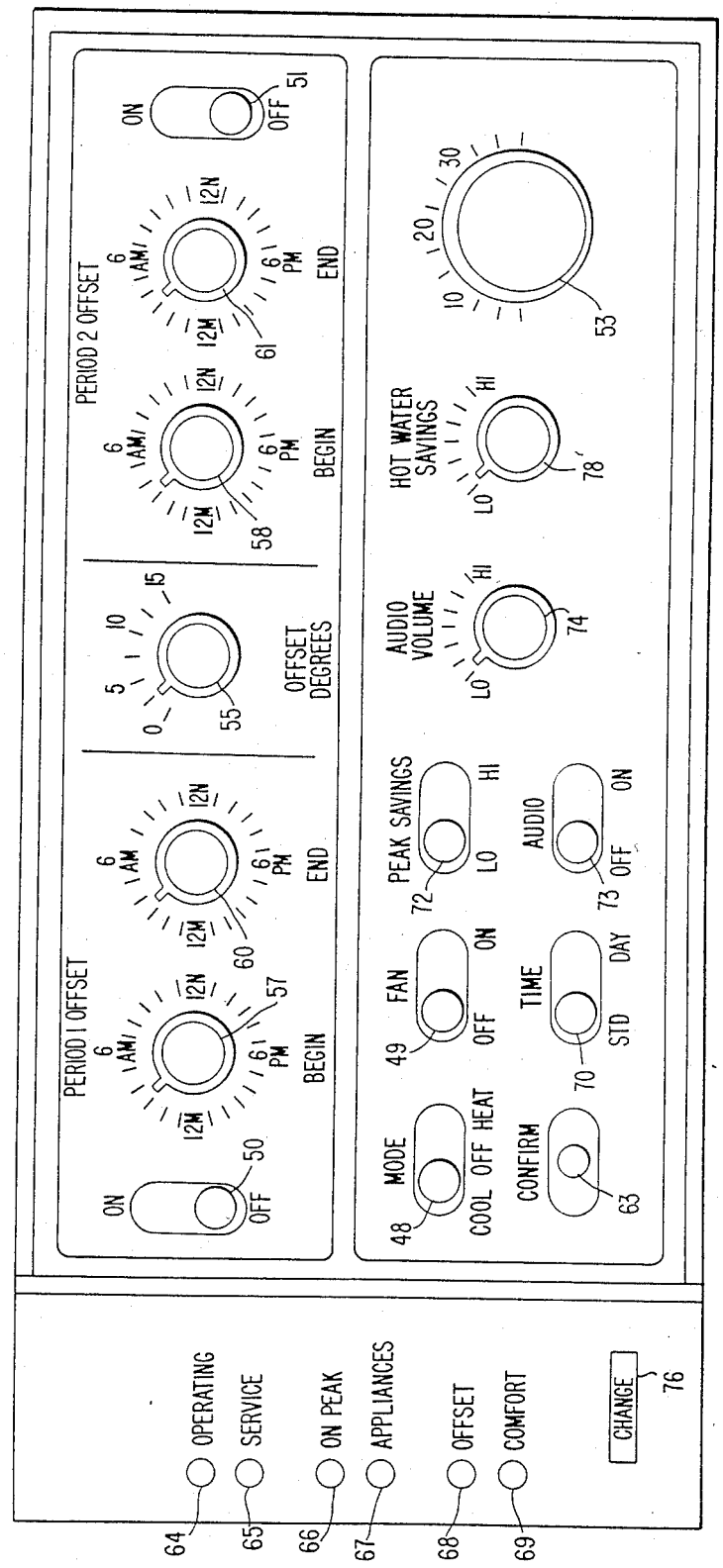
FIG. 2 is a front elevation of the control panel of a homeowner's console (HOC) usable in the system of FIG. 1.

A preferred embodiment of console 44 is shown in FIG. 2 and includes the following controls and displays:

(a) A mode switch 48 movable to select and indicate a heating mode, a cooling mode and off;

(b) A switch 40 to select and indicate "fan only" operation during the "off" mode;

(c) Switches 50 and 51 to select and indicate that night and day offsets (i.e., setups or setbacks) are to be effective: i.e., on or off;

(d) A dial 53 connected to a potentiometer which allows the homeowner to select a desired temperature to which the residence interior will be heated or cooled;

(e) A dial 55 connected to a potentiometer which allows the homeowner/occupant to select an offset, i.e., a number of degrees by which the desired control temperature will be changed during selected intervals in either the heating or cooling mode;

(f) Dials 57 and 58 (also connected to potentiometers) to select and display the times at which the system will go into offset (i.e., setup or setback) at night and during the day;

(g) Dials 60 and 61 with potentiometers to select the times at which the system offsets will end;

(h) A "confirm" light 63 to inform the user that new operating conditions have been accepted by the system;

(i) Lights 64–69 respectively to indicate that the system is operating, that it needs service, that it is operating in a period of on-peak rates for electrical energy, to give an appliance alert, to indicate that the system is in an offset mode, and to give a comfort alert which will be further described;

(j) A daylight/standard time switch 70;

(k) A peak savings switch 72 allowing selection of either a most economical method of operation (HI) or a maximum comfort mode (LO);

(l) An audio on/off switch 73;

(m) An audio volume control 74;

(n) A "change" switch 76 which can be used to alter the offset condition; and (o) A hot water savings selector dial 78.

It will be understood that various ones of these controls can be combined or arranged differently but that the basic functions should be retained.

Figure 3:
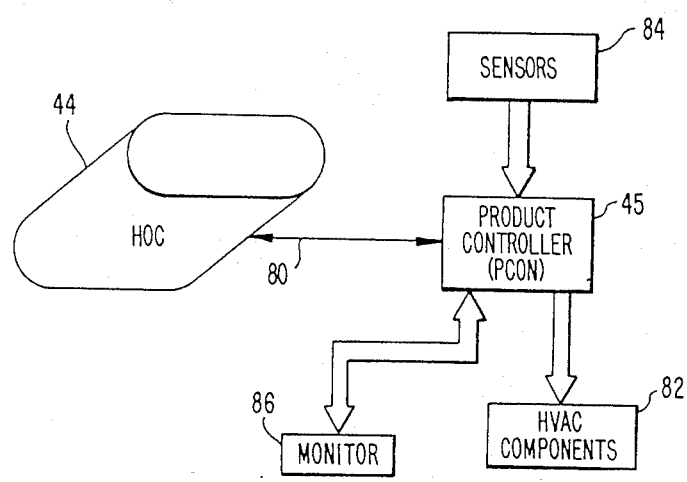
FIG. 3 is a schematic diagram of the control equipment usable with the system of FIG. 1.

FIG. 3 illustrates in a very simplified block form the data flow relationships between components. The homeowner's console 44, which includes not only the display panel discussed in connection with FIG. 2 but also a degree of data processing capability; is interconnected by a bidirectional serial link 80 with the product controller 45 which is preferably within, but could also be outside of, generator 14. The product controller supplies output signals to activate the HVAC components which, in FIG. 3, are grouped together as a block 82. Inputs to the product controller 45 include those received from homeowner's console 44 on link 80 and also the inputs from eleven sensors which are grouped together as a block 84. For purposes of servicing and for performance of some calibration functions, a monitor unit 86 can also be coupled to the controller. However, the monitor does not constitute a part of the basic system and will not be described in further detail herein.

The homeowner's console contains software to review the positions of various switches and dials and to communicate this information to the product controller on link 80, and also includes the necessary software to receive messages from the product controller and to prepare messages for transmission to the product controller. The product controller software, as will be further described, operates on the basis of epochs which are approximately 4 seconds long and during which various steps are accomplished. During each epoch, a panel update message is constructed by the product controller (PCON) software and transmitted to HOC where the message is used to update the state of the indicator lights and the audio alarm. In response to receipt of a message from PCON, HOC prepares a message and returns it to PCON, including information about any new dial or switch settings which have been made. That message is then used by PCON in the epoch after the one in which it is received. The message from HOC to PCON includes the status of seven of the switches (all except audio switch 73) and employs eight bits for this purpose. Mode switch 48 and fan switch 49 together use three bits because the mode switch is a three-position switch and the fan switch is dedicated through the "OFF" position thereof. Each of the other switches uses one bit.

The HOC software code is stored in read-only memory and the same program is repetitively recycled. The software performs the functions of reading the dials and switches set by the owner and writing these values to PCON in the message previously discussed. The software also provides immediate feedback to the homeowner when a dial or switch position is changed by illuminating confirm light 63. Feedback is also supplied when the change switch 76 is depressed by flashing the offset light 68 for a predetermined interval. The software monitors for safety conditions and accepts LED and audio control values from PCON. On the basis of values received from PCON, the various lights 64–69 are controlled and the software also is capable of cooperating with PCON in performing certain calibration procedures, although the software performs its functions whether or not calibration procedures are in process. From this it will be recognized that the HOC software acts as an interface with the homeowner and provides information to PCON and is essentially a buffer between PCON and the homeowner.

Returning to the epoch concept, the PCON includes two clocks, one of which is called an epoch relative (ER) clock which receives counts at the rate of 12 per second from a system clock oscillator and which provides the fundamental counting required to keep the various events coordinated. The epoch relative clock produces a square wave which is low for 1/60 second and is high for 4/60 second. The falling edge of each square wave is counted and 48 such square waves are used to define one epoch which thus lasts 4 seconds. The system also includes a "start relative" (SR) clock which is updated at the beginning of each epoch but always has a count which is a multiple of four. The start relative clock is never reset.

The first twelve counts of the epoch relative clock are used to define an interval during which information is received from HOC and also during which a major portion of the information processing is accomplished by the product application software (PAS). Communication within the system follows PAS processing. The remaining interval is also used for communication within the system and for other functions.

Figure 4:
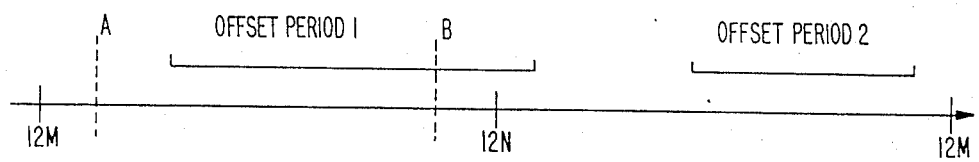
FIG. 4 is a timing diagram useful in explaining offset functions of the system.

It is necessary to introduce the offset concept in order to discuss the function of the change button on HOC 44. A time scale is shown in FIG. 4 with 12 Midnight, 12 Noon and 12 Midnight of a day being illustrated. Two offset intervals are illustrated above the time line, offset 1 running from early morning until just after noon, and offset 2 extending from late afternoon until just before midnight. There is no reason why these intervals cannot be either longer or shorter and no reason why they cannot overlap. However, for purposes of illustration, the depicted arrangement is suitable. These intervals are established by setting the beginning and ending times of the period 1 offset and period 2 offset dials 57, 58, 60 and 61, and by then placing switches 50 and 51 in their on positions. During those periods, an offset will be in effect, the amount of the offset being determined by the setting of dial 55 which indicates a number of degrees higher or lower in either the cooling or heating mode, respectively, than the basic control temperature selected by the position of dial 53. When the system is operating in one of the offset periods, offset light 68 is illuminated.

If, for any reason, the homeowner decides that the offset should no longer be in operation or if an offset is not in operation and the homeowner decides that it should be, the change button is depressed. The system follows the protocol of recognizing only the beginning of an offset which is encountered first. If it is assumed that the change button is depressed at time A in FIG. 4, the effect is to move the leading edge of offset 1 to position A, putting the system into offset and leaving it in offset until the established end of offset 1. At that point, the system will go out of offset and will remain out of offset until the beginning of offset interval 2. In the next 24-hour period, however, time A will not be remembered; offset 1 will begin at the time established by the setting of dial 57.

If the change button is depressed at time B, the system will go out of offset condition 1 and will remain out of offset until the beginning of offset interval 2. In either case, when the change button is depressed, the offset light flashes for a selected number of seconds to indicate that the change has been made.

The HOC software, as mentioned before, also monitors for safety conditions. As previously indicated, PCON is programmed to transmit a message to HOC every epoch. If no message is received from PCON in a predetermined interval of, for example, 12 seconds, operating light 64 is extinguished and service light 65 is illuminated, indicating to the homeowner that something is not working properly and the system needs attention. All other lights are extinguished.

As will be recognized from the presence of the audio switch and volume controls, an audio signal is produced by the homeowner console in response to a message from PCON that design limits are being exceeded, giving the homeowner the opportunity to modify the manner of operation of the system to avoid unnecessary expenditures. These functions, along with the savings functions, will be described in greater detail in connection with PCON software.

A description of the software organization and implementation is provided in an outline form, recognizing that the specific program steps used to implement the details can be derived from this outline in any suitable language familiar to an experienced programmer. The programming technique chosen for the controller is modular and involves a software interrupt approach. Each module of the program can be said to be a part of either a set of background functions or a set of foreground functions. The background function modules perform various support functions and the foreground modulus mutually generate signals which accomplish the operation of the HVAC system components.

The system operating functions which are performed by those modules in the foregoing group are:

(a) Determine the system mode (heating, cooling, fan only or off);

(b) Determine the demand control values;

(c) Heat domestic water (potable supply) using resistive heating (only during off-peak times);

(d) Condition the space using the hot or cold storage tank;

(e) Coordinate operation of the heat pump; and (f) Condition the storage tank using resistive heating.

The system support functions, which are performed using those software modules in the background group, include:

(g) Control operation to assure high instantaneous operating efficiency;

(h) Minimize defrost cycles;

(i) Heat domestic water (potable supply tank) with the heat pump;

(j) Optimize offset energy savings and control;

(k) Provide the system user with discretionary control of the comfort level in the space;

(l) Allow the system user discretionary control of the domestic hot water temperature and optimize the contribution of the heat pump to heat that supply tank;

(m) Provide communication capability and flexibility between the user and the control system to accomodate a change in the user (new tenant or homeowner) or the user's lifestyle;

(n) Calibrate the temperature, amperage and voltage sensors; and (o) Provide "soft" and "hard" safety alarms.

It should be noted that there is not a one-to-one correspondence between the above functions and the software modules. In fact, some of the functions require several modules for their accomplishment.

The software organization can also be viewed in terms of various functional requirements imposed on the system and the individual program modules are best understood in this organizational form. These functional requirements are grouped in 9 function classes as follows:

Class 0—Applications software to interface with the operating system and the outside world;
Class 1—Convert input data to meaningful information;
Class 2a—Filter and interpret input information;
Class 2b—Calibrate sensors;
Class 3a—Determine system performance requirements;
Class 3b—Operate HVAC hardware subsystems;
Class 4—Generate safety and inhibit flags;
Class 5—Generate requests for specific devices; and
Class 6—Control HVAC hardware, and compute and check KVA draws of each component.

The software modules in these classes are as follows. It should be remembered that these operations are not being performed sequentially. Rather, they are normally concurrent and are quire independent of each other, for the most part.

Check Initialization

In this module the basic time functions for the software operation are established and reviewed. As previously indicated, the software uses an interval called an epoch which has segments during which certain events can or will be caused to happen. Operation is commenced with a start epoch which is 4 seconds in duration and an initialization period containing about 134 epochs. These differ from all other epochs in following one branch of a conditional transfer statement when the equipment is first energized whereas, in subsequent epochs, the other branch is followed. During that first epoch, initial conditions for various values are established and initial readings are made. Thereafter, normal epoch length is 4 seconds, as described above, of which approximately 1 second is used for processing various parts of the software and a word is formed (Class 5, above) which identifies desired actions. In the following class, the word is acted upon in a specific order as will be described in connection with the "SEQUENCER" module. The remaining 3 seconds are used for communication. In this context, "communication" includes transferring values to and from HOC 44 and activating or de-activating components of the system. During the first second of each initialization epoch, the system cycles through the modules of the software, looking for flags which indicate requests for specific action.

Normalize A to D Converted Counts

In this sytem, normalized values are used rather than absolute values. All analog sensor measurements are converted into digital form using a voltage-to-frequency converter and the raw counts resulting from that conversion are received during a 4/60 second read interval. Those counts are then normalized or scaled on the basis of, for example, zero to 4000 counts being equal to zero to 5 volts. The conversion process provides a high degree of noise immunity for the system, a serious concern in a residence which is an electrically very noisy environment.

Convert Power Sensor Values

An important part of the present system is the monitoring of the voltage and current, i.e., the power, delivered to the residence or other space in which the system is installed. The power monitoring is used, as mentioned above, to decide when it is economically most efficient to energize components of the HVAC system and to operate those components at the most efficient times, taking comfort criteria into consideration. The power monitoring is also used to check to see when a component of the system is energized after a "start" command has been issued, and to evaluate proper operation by, for example, checking the current drawn by a fan motor after energization. In addition, the appliances light 67 on HOC 44 is energized to inform the homeowner that the space is operating over a preselected level of KWE usage and that the cost of energy used can be reduced by turning off, or not using, an appliance at that time, e.g., by delaying operation of a dishwasher.

Figure 5:
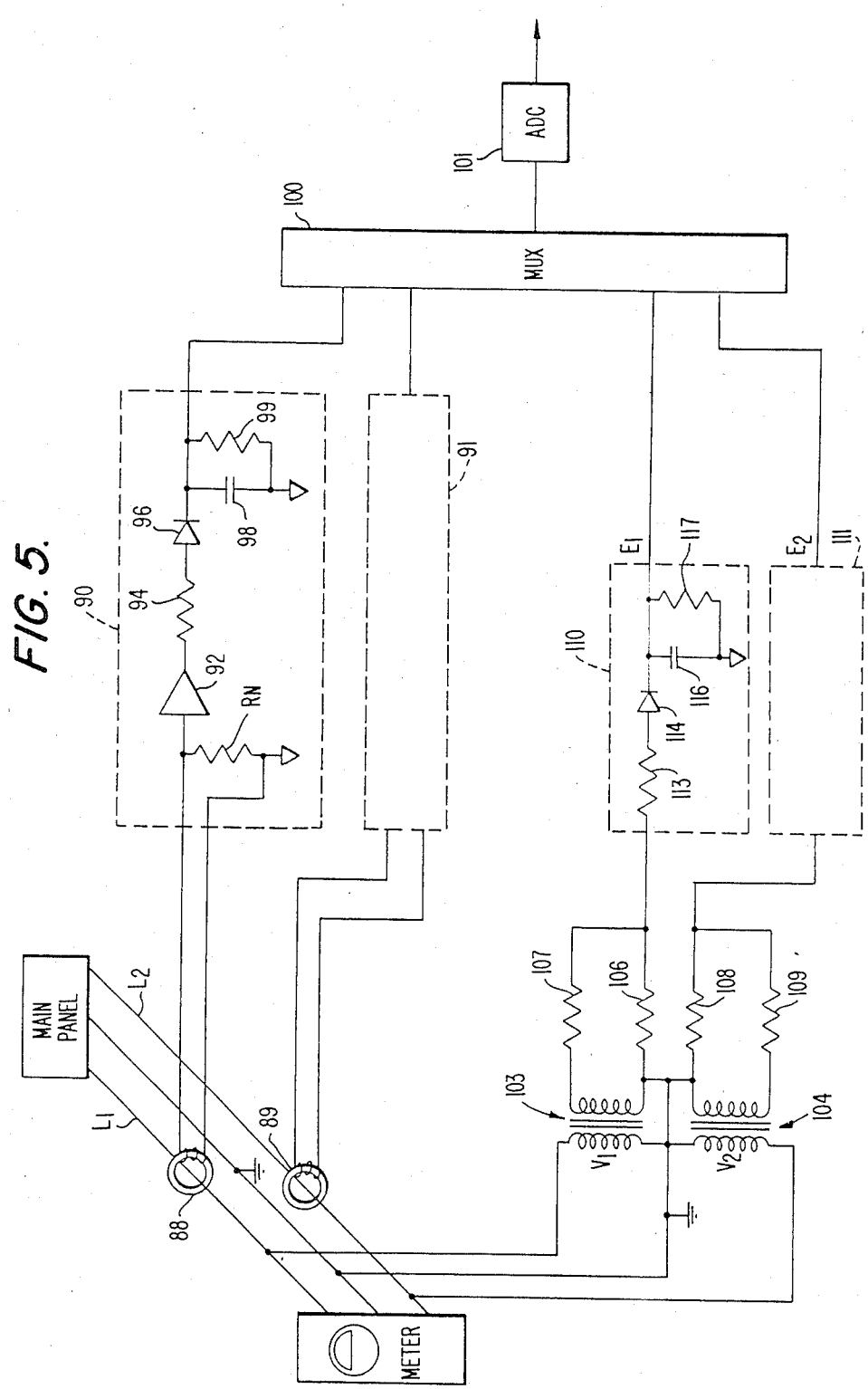
FIG. 5 is an electrical schematic diagram of the power monitoring circuits in a system in accordance with the present invention.

To monitor the current, a toroidal current transformer is coupled to each leg of the power lines feeding the residence as schematically shown in FIG. 5. Thus, line $L_1$ has a current transformer 88 coupled to it and a similar transformer 89 is coupled to line $L_2$. Suitable transformers for this purpose are type JA1-0 manufactured by General Electric Company, or a similar device, with a current ratio of about 200:5. The output of transformers 88 and 89 are connected to current-to-voltage converters 90 and 91, respectively. These converters are identical with each other, each converter including an input resistive network $R_N$ to provide an input impedance in accordance with the manufacturer's specifications to maintain the output current of the transofmer within design characteristics. The voltage across $R_N$ is connected to the input of an amplifier 92 which has a gain of about 12.5, the output of the amplifier being connected through a current limiting series resistor 94 to a rectifier 96. The rectified voltage is stored in a capacitor 98 which is connected between the diode output and ground, the capacitor also having a bleed resistor 99 connected in parallel with it.

The voltage outputs of circuits 90 and 91 are connected through a multiplexing circuit (MUX) 100 to the input of an analog-to-digital converter 101, this converter being a voltage-to-frequency converter which provides an output which is a number of pulses proportional to the amplitude of the measured voltage. The values of the capacitor and bleed resistor circuits 98, 99 are chosen so that the voltage value is held long enough to be read and converted by MUX and ADC 100, 101 but so that the value on capacitor 98 will change if the current input drops suddenly. The response is selected to be such that a one volt step decrease at the output of amplifier 52 will result in an equivalent voltage on capacitor 98 within 0.5% in 2 seconds.

FIG. 5 also schematically illustrates the voltage sensing technique which is somewhat similar in nature. Stepdown transformers indicated generally at 103 and 104 couple voltages proportional to line voltages $V_1$ and $V_2$ to voltage dividers which include resistors 106, 107, 108 and 109. Each pair of resistors 106, 107 and 108, 109 is selected in value to be in the order of 1 megohm or more. The voltage appearing at the junction between resistors 106 and 107 is connected to a preparation circuit 110 and the voltage appearing at the junction between resistors 108 and 109 is delivered to a preparation circuit 111. Circuits 110 and 111 are also identical and include a current limiting resistor 113, a rectifying diode 114 and a parallel circuit including a capacitor 116 and a bleed resistor 117. Again, each capacitor-resistor circuit stores a voltage which is coupled through MUX 100 to ADC 101 for conversion. Thus, ADC 101 receives a voltage $E_1$ proportional to $V_1$, and, in another time slot, a voltage $E_2$ from circuit 111, proportional to voltage $V_2$.

In normal operation, the voltages, as measured to ground, on legs $L_1$ and $L_2$ should be substantially equal and the PCON software evaluates this to determine whether the readings sequentially received from converter 101 are likely to be valid values. If so, these values can be calibrated by establishing a correction factor in a lookup table so that it is not necessary to actually physically adjust any values in the circuit.

Calibration of the voltage readings $E_1$ and $E_2$ is accomplished by establishing the relationship that when $V_1 = 138$ volts RMS, $E_1 = 5$ volts, and when $V_1 = 0$, $E_1 = 0$. The value of $E_1$ at any $V_1$ can then be found by using the expression $$V_1 = E_1 * 138/5 * M$$

in which M is a correction factor close to one. The software performs this manipulation during calibration and compares the result with an operator-measured value. If there is a difference, a new M is prepared and stored for subsequent use.

Power Sensor Calibration

The current sensors are calibrated using the known resistance values of the domestic hot water and storage resistive heating elements 42 and 40. The calibration is done during the initialization period and can also be done at a time when it is unlikely that other appliances in the home will be used, e.g., 0300 on Sunday morning. The procedure is to turn off all of the HVAC equipment, energize the DHW element 52 and record the current in each leg, identifying that measured current as an "off" value. The resistive element 40 in the storage vessel S1 is then turned on and the differential amperage in each leg is recorded along with the absolute "on" amperage. The resistive element is turned off again and the difference between the currents in the two legs is again recorded along with the new "off" amperage. If the "on-to-off" and "off-to-on" differentials in each leg fall within 0.2 amperes of each other, then it is assumed that the only current read during this procedure was that caused by the action of turning the heating elements 40 on or off and the calibration process can proceed. If there is a greater differential, the previous steps are repeated a few times until readings with the small differential are obtained. If they are not obtained, the calibration procedure is not pursued any further.

If the small differential is obtained, there is a high probability that the only current draw recorded in the switching cycle was that caused by the energization of the heating elements 40. The real amperes that the heating element should have drawn can then be calculated, knowing the voltage drop across the element and the known resistance. The voltage is obtained by adding the $L_1$ and $L_2$ voltages together and the "real amperes" is calculated by dividing this value by the known resistance which, for two 4.5 kilowatt element in parallel, is about 6.4 ohms. Two adjustment factors can then be created by dividing the "real amps" by the average "on-to-off" and "off-to-on" differentials for each leg. These factors will be used by routines that convert the power sensor values in each subsequent epoch.

System Power Calibration

The total system wattage can be determined by adding together the wattages calculated for each leg. Note that the final wattage is actually a VA value because it assumes that all loads are resistive in nature. The algorithms for performing this calculation are as follows:

L1—WATTAGE=L1—VOLTAGE*L1—AMPERAGE

L2—WATTAGE=L2—VOLTAGE*L2—AMPERAGE

SYS—KVA—INST=(L1—WATTAGE+L2—WATTAGE)

wherein SYS—KVA—INST is the instantaneous system volt-amperes, a figure which for most residences is sufficiently close to KWE as to be usable as a wattage figure.

Software Organization

Figure 6:
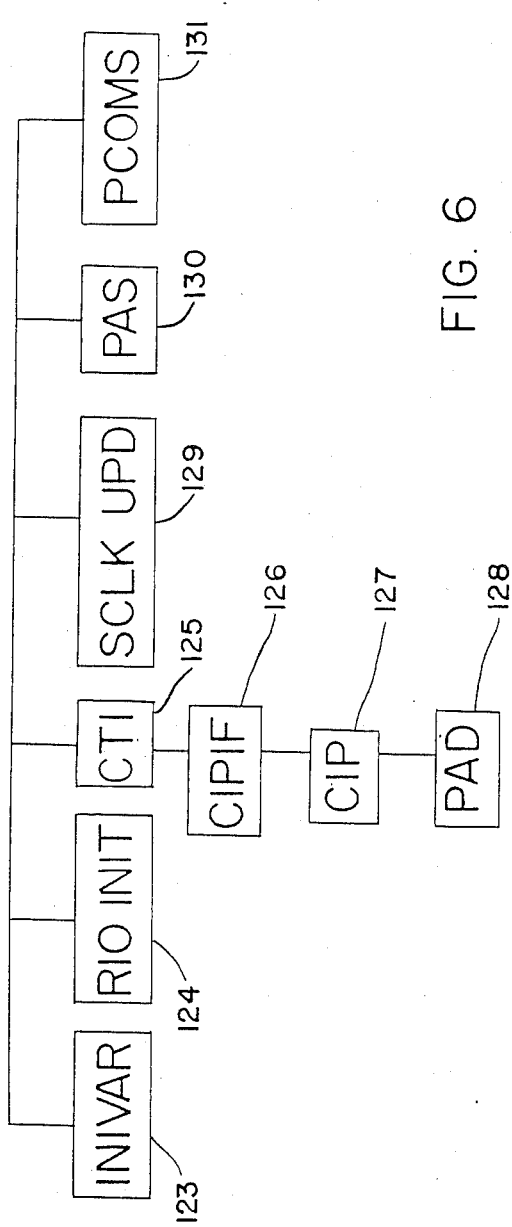
FIG. 6 is a block diagram illustrating the overall organization of software usable in a system in accordance with the present invention.

The overall organization of the software for the system is shown in FIG. 6 in which blocks 123 and 124 consist of a software bootstrap active during the first epoch during which initial values are established for variables and the input-output configuration is established. Block 125 involves connection to interrupt sequences including an interrupt processing interface (CIPIF) 126, a clock interrupt processor which updates the epoch relative clock previously referred to and the start relative clock, and analog-to-digital conversion sequences (PAD) 128. The software also includes a system clock update procedure 129, the main product application software 130 and the communication PCOMS 131. The routines discussed above for checking initialization, normalizing counts and computing power are actually part of the product application software. Other portions of that software will now be described.

Temperature Sensor Conversion

Figure 7:
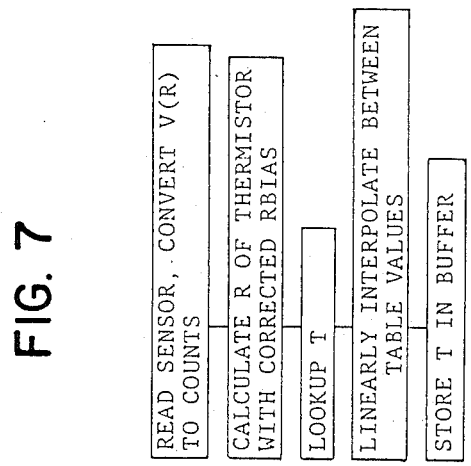
Figure 9:
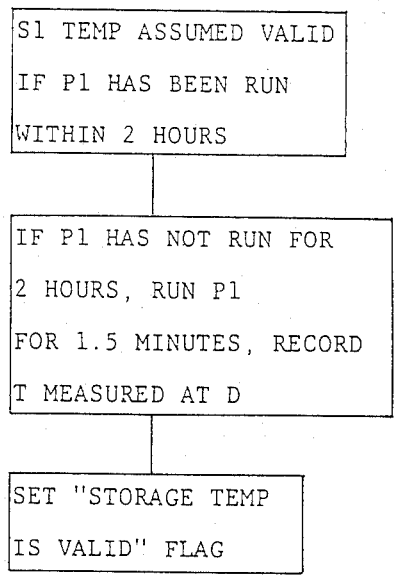
Figure 10:
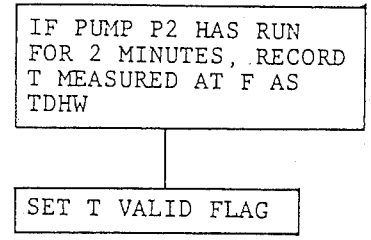

FIG. 7 outlines the procedure for converting the temperature measurement and obtaining a usable value. The temperature sensors themselves are negative resistance characteristic devices known as thermistors. The actual measurement is thus of a resistance value and the resistance value is initially converted to a count by a voltage to frequency converter.

A ROM look-up table is created from manufacturer's data for an ideal thermistor in which temperature values and the corresponding resistance values are stored. When an actual measurement is being made, a resistance value is read as a voltage which is converted to a count. Since the value of resistance at any given temperature for a specific, real, thermistor is not necessarily the same as for the theoretical ideal thermistor, a correction factor is created for each thermistor during calibration which is applied to the count and a resistance value R is calculated. That value is then used to look up a value T from the table.

The sensor circuit itself is quite conventional and comprises a series circuit of a fixed value bias resistor RBIAS and the thermistor R(T) connected between a positive DC supply Vo such as 5 volts and ground. The signal Vin(T) is taken from the junction between those two resistive elements. The bias resistor RBIAS performs the functions of current limiting to prevent thermistor runaway and also forms the divider which allows the voltage Vin(T) at the junction to be a reasonably linear function of temperature within a specified range. The algorithm for conversion to a number of counts is as follows.

$$Vin(T) = Vo*(R(T)/(R(T)+RBIAS))$$

$$COUNTS(T) = Vin(T)*VCOL$$

where VCOK is the magnitude-to-count conversion factor for the voltage-to-frequency converter, in this case, 400. Thus, $$COUNTS(T) = 400*Vo*(R(T)+RBIAS)).$$

Generally speaking, the characteristics of a real thermistor differs from that of an ideal thermistor by a factor called BETA which involves angular rotation of the characteristic slope of the real from the ideal about a known temperature such as 25° C. Thus, BETA=0 at 25° C. and can be plus or minus at any other temperature, i.e., the rotation about the 25° C. point can be clockwise or counterclockwise for any given thermistor. In addition, the slope of the characteristic can be laterally offset, creating a constant difference from the ideal added to the BETA factor.

It would, of course, be possible to install an adjustable resistor as RBIAS but that has a number of disadvantages including the need to have precision calibration equipment available at the installation site and also the greater cost of an adjustable element of adequate quality. In this sytem, temperature differences are generally used rather than absolute temperature measurements except for the return air sensor H. Calibration is necessary in either case such that, if two sensors are responding to the same temperature, the system receives information reflecting this fact.

The expression given above for COUNTS(T) can be rearranged to solve for either R(T) or RBIAS. Calibration can be accomplished without expensive equipment by working at 0° C. The thermistor being calibrated can easily be brought to that temperature by simply immersing it in an icewater bath. The voltage of the thermistor is read and converted to counts. Assume, for purposes of example, that a "perfect" RBIAS has a value of 7320 ohms and a "perfect" thermistor at 0° C. produces a voltage which converts to 1633 counts. Further assume that a thermistor Y being calibrated produces a voltage at 0° which converts to 1594 counts. With this information, the software then assumes that thermistor Y is perfect but that the bias resistor is faulty. The equation is then solved for RBIAS.

$$RBIAS = R(T)*(Vo*400 - COUNTS)/COUNTS$$

$$= 32650*(5*400 - 1594)/1594$$

$$= 8316 \text{ ohms}.$$

This value for RBIAS is assigned to a location in memory as the correct value and is subsequently used for future engineering unit conversions of counts received for that specific thermistor. Note that the RBIAS value (the actual value of the RBIAS resistor) may, indeed, be 7320 ohms but the value calculated above is used, thereby compensating for the thermistor error.

As an example of this conversion, assume that two thermistors X and Y have perfect 7320 ohm RBIAS resistors and that thermistor Y is the one for which calibration was performed above. Further assume that both therm:istors are at −10° C. At that temperature, the following conditions would exist for a perfect thermistor and for thermistors X and Y if all of them have perfect RBIAS resistors

| Thermistor | COUNTS | Actual Resistance |
|---|---|---|
| Perfect | 1765 | 55330 ohms |
| X | 1788 | 61740 ohms |
| Y | 1737 | 48350 ohms |

The uncalibrated engineering conversion of the above values would result in a conversion to readings of −12 1° C. for thermistor X and −7.7° C. for thermistor Y. These readings actually represent examples of extreme deviations and are at the limits, in opposite directions, of what would usually be acceptable to the manufacturer. This deviation is unacceptable when both are at −10° C. The engineering conversion is accomplished as follows.

If the software assumed that thermistor X is correct and has a bias resistor equal to 7320 ohms, it calculates R(T) using the equation to arrive at the above answer of 61740. It will then interpolate between the values of R(T) in ROM to arrive at the thermistor temperature of −12.1° C.

The software will use the same equation to calculate the resistance of thermistor Y. The counts used are those recorded for Y, and the value of RBIAS is 8316 ohms, the calibrated value assigned in the memory The resulting answer is 54,924 ohms, and the software again interpolates to determine that this corresponds to a temperature of 14.28° F (−9.84° C.) The difference now is 0.16° C., 0.29° F., which is within an acceptable range. A similar calibration should then be done for thermistor X.

The result is stored in buffer memory for use by other routines This procedure is, of course, accomplished for each of the temperature sensors repeatedly. Whether the value of temperature obtained is valid or usable depends on other factors.

Maintain House Temperature

Figure 8:
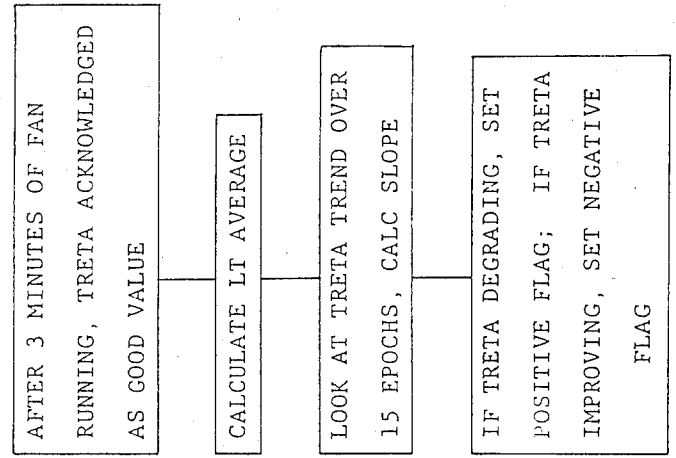

FIG. 8 illustrates a Maintain House Temperature routine. As previously mentioned, the temperature measurement (which is roughly equivalent to the measurement made by a temperature sensor in a thermostat in a more conventional system) is made, in the present system, at the return air location. This is the location near and upstream of exchanger 32 at location H (FIG. 1) where the air from all of the return air ducts are joined together. Thus, the temperature measured at that point is the temperature of a mixture of air flowing from various parts of the residence being controlled. It is, however, absolutely essential that the house fan 34 be running before a temperature measured by the sensor at location H is used for any purpose. If fan 34 has not been running for some time, the sensor could be measuring a temperature which is simply the temperature of the basement or other location for the heat exchanger itself. The temperature could be artificially high or artificially low, but is normally meaningless. Thus, the routine begins by checking to see whether the fan is running. If it is not, no further steps are taken.

After a three minute interval of fan operation, the return air temperature TRETA is regarded as being a valid value and the remainder of the routine can proceed. A long term average (LTA) value of TRETA is calculated and. a slope of the values of the LTA for the past 15 epochs is calculated. The routine examines the slope on the basis of the set point temperature and sets a positive flag if the air temperature is degrading and a negative flag if the air temperature is improving.

Maintain Storage Temperature

The purpose of this routine is to maintain the temperature of storage tank S1 at a desired level, either hot or cold, depending upon the selection of a heating or cooling mode. As will be recognized from FIG. 1, with a 120 gallon water tank, the temperature persistence is significant. Thus, the temperature at location D (TSTO) as recorded just as the pump shut off the last time is regarded as being the temperature of tank S1 and as being valid regardless of whether pump P1 is or has been recently running until P1 has been off for over 2 hours. Thus, if no other routine has caused P1 to run for, e.g., 2 hours, this routine energizes P1, receives a new temperature measurement from sensor D (TSTO) and records that measurement as a replacement for the prior value. A flag is then set indicating that the temperature either is or is not within the desired range.

Maintain Domestic Hot Water Temperature

The maintenance of the temperature of tank S2 (TDHW) presents a slightly different problem because the temperature of that tank as measured at location F is known to be valid only when pump P2 has been running. There are several factors involved in the variations of the tank S2 water temperature including the temperature of ground water, utilization of the hot water in an essentially unpredictable fashion, and the fact that water can flow through pump P2 even when the pump is not operating. Thus, when pump P2 is operating, water flows past sensor F (TDHW) through the water side of exchanger HX-2, through the pump, to the bottom of the tank, through line 36 and back to HX-2. Thus, after the pump has been running for a predetermined interval, i.e., 2 minutes, a flag is set indicating that the temperature being measured is a valid measurement of the temperature at the bottom of tank S2.

Maintain Ground Water Temperature

Figure 11:
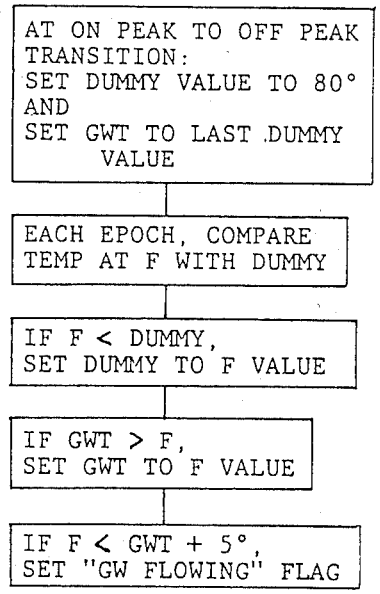

It is necessary to know the ground water temperature for certain calculations and this temperature is established as illustrated in FIG. 11. Ground water temperature does not normally change in a drastic or sudden fashion, but it does change. Because of certain difficulties in making a direct measurement which can be regarded as reliable, a "downward search" technique has been developed. A "dummy" value of temperature is selected and stored in a first location in memory, this value being selected to be higher than an expected value of ground water temperature (GWT). If in any epoch the value of temperature measured at sensor F is found to be less than the stored dummy value, the measured value is substituted for the dummy value. Thus, assuming that the dummy value starts above actual GWT, the dummy value asymptotically approaches true GWT.

At each on-peak to off-peak transition, the last (lowest) dummy value is stored as the best GWT in a second memory location and the dummy value in the first location is reset to its higher level, e.g., 80° F. In addition, if the temperature measured by sensor F is found to be lower than the stored GWT value, the measured value is substituted for stored GWT along with the dummy value. If the value measured at F is less than the stored GWT plus 5°, a "ground water flowing" flag is set. The program thus permits the stored GWT value to be increased over a period of time in a season when the actual GWT temperature is increasing.

Compute KVA

Figure 12:
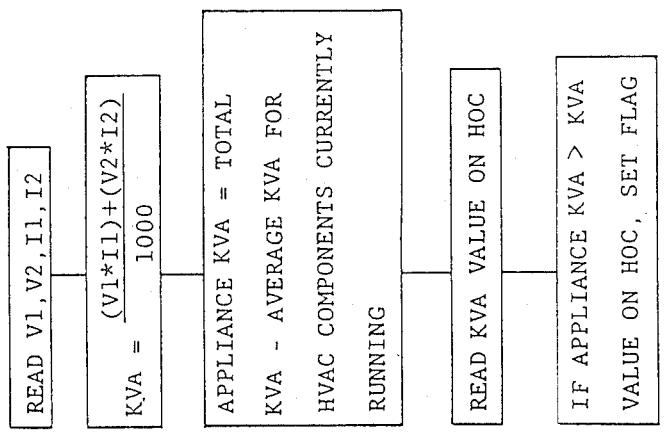

In order to arrive at a value of the energy being used by the residence, the voltage and current values are measured at the incoming power lines as illustrated in FIG. 12. The KVA value is then calculated by multiplying the voltages and current, adding the values to arrive at a total KVA figure. A value referred to as an "appliance" KVA" is then reached by subtracting from the total KVA a value for the average KVA being used by the HVAC systems currently running. An adjustment on the homeowner console establishes a value of KVA which should not be exceeded in order to maximize the savings. If the appliance KVA value exceeds the value read from HOC 44, a flag is set.

Calibrate Temperature Sensors

This calibration requires no illustration because it is simply a process of normalizing the ambient temperature to the compressor liquid temperature at a time and under conditions which are such that the liquid temperature can be assumed to properly reflect ambient. This is accomplished in the middle of the night when the compressor has not recently been energized, i.e., for a number of minutes.

The stored value of ambient temperature is changed to be equal to that measured at location B. At this time, a new bias resistor value (RBIAS) is calculated and compared with the previous RBIAS value which is stored in nonvolatile memory. This can be used as a check on the condition of sensor B; if the values are very different from each other, a bad temperature sensor is indicated and a service flag is set.

A similar process is performed to calibrate the temperature of the storage tank S1. If the compressor or pump P1 have not been on for a number of minutes, the S1 temperature can be assumed to be the temperature at locations D and A and it is therefore possible to normalize the storage tank temperature TSTO to exchanger temperature THX-1.

This process is also followed to normalize the temperature of the water line entering HX-2 as measured at F to the temperature of the water line entering HX-1 as measured at D if the compressor and pump P2 have not been on for a number of minutes and also if ground water has not been run recently.

In a similar fashion, the discharge temperature of the compressor can be normalized to the temperature of heat exchanger HX-1 so long as the compressor and pump P1 have not recently been energized.

Detect Conditioning Mode

It was previously pointed out that the product controller software transmits a message to HOC 44 at the beginning of each epoch. In response to that message, HOC 44 writes a message to the product controller, including data about switch settings, etc. The message includes three bits which indicate the positions of the mode selector switch 48 and fan switch 49. Four configurations of those bits are recognized as requesting heating mode, cooling mode, off mode with no fan and off mode with constant fan. In addition, if it is recognized that the message indicates a mode change from the previous epoch, the time of the change is recorded for diagnostic purposes.

Implement Offsets

Offsets can be defined as control point deviations from a selected set point temperature. Normally, they are thought of as temporary deviations and they can be used to define intervals of the day during which a lower demand is placed on the HVAC system. As an example, in the heating mode with a setpoint of 70° F. established by dial 53, the homeowner could establish an offset interval beginning at 8:00 a.m. and ending at 4:30 p.m. during which an offset of 10° F. is in affect, making the effective set point 60° F. during the interval when the space is unoccupied. The same offset might be used from 10:00 p.m. to 6:00 a.m. while the occupants are sleeping.

In order to implement this, the general approach is to build a table of time sorted "offset events" covering a three-day period which covers yesterday, today and tomorrow. For this reason, there is no illustration of this routine. An offset event is defined as the beginning or end of an offset period. Event times are delivered to PCONS from HOC 44 as seconds after midnight and are stored in the table as seconds since system startup in the same manner as the PCONS start relative clock. The homeowner can use dials 57, 58, 60 and 61 to set widely variable combinations of times for offsets. To avoid difficulties in handling these, the following rules are followed in the routine.

At any point in time one and only one offset is considered to be dominant. The dominant offset is the one which most recently had a transition from not-in-offset to in-offset. This was discussed in part in connection with FIG. 4. The dominant offset is the one of two overlapping offsets which would be affected by depressing the change button.

When the start and end times for the same offset, as determined by the settings of dials 47 and 60 or 58 and 61, are less than 15 minutes apart, the system is considered to be within perpetual offset. The shortest offset period, therefore, is 15 minutes. The longest finite offset period is 23 hours 45 minutes.

Offset periods are considered to be overlapping when the start time of one offset lies between the start and end times of the other. If the start time for one offset is less than 30 minutes later than the end time for the other offset, the two times are considered equal and, therefore, the two offsets overlap. In such a case the end time of the earlier offset will be set to the start time of the later offset.

Depressing the change button 76 affects processing from the time it is pressed until the next transition into or out of the dominant offset. Changing dominant offsets is equivalent to such a transition.

The outputs from this code are a flag indicating whether or not the system is in offset and, if it is, the time at which the offset is expected to end. This information is used in other routines to prepare the system for the next non-offset interval.

Implement Recovery From Offset

Figure 13:
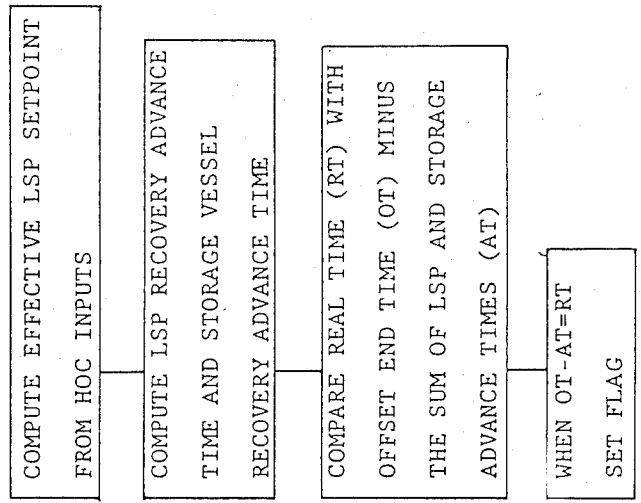

As shown in FIG. 13, it is first necessary to compute the effective living space set point as determined from the HOC inputs together with any change which has occurred. Assuming that change button 76 has not been depressed, the number of degrees of offset established by dial 55 is added to or subtracted from the setting of dial 53 for the offset period which will be arriving next, in point of time. It is then necessary to compute the living space recovery advance time and the storage vessel S1 recovery advance time. The concept of recovery advance time involves evaluating the difference in temperature between the current living space temperature as measured by the most recent return air measurement and the temperature of the next non-offset interval, establishing a slope based on predetermined characteristics of the space as a function of outdoor temperature and the present temperature of the water in storage tank S1, and establishing how much time will be required to take the living space from its existing temperature to the desired one. This is the recovery advance time.

It is then necessary to compare the real time with this offset time minus the advance time, in other words, establish an interval by which the conditioning must commence in order to reach the next needed temperature at the right time. Thus, when the offset time minus the advance time equals the real time, a flag is set indicating that something should be done to condition the space. It will be readily apparent that the water in tank S1 must be within a desired range of temperature in order to accomplish the necessary space conditioning.

Detect Changes

Figure 14:
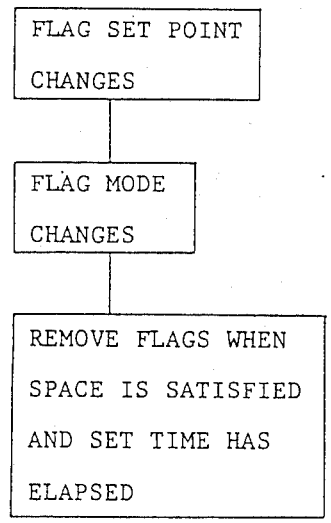

FIG. 14 illustrates a detect change routine in which flags are set in the event of a change in set point or a change in the position of mode switch 48 as determined from the HOC message. The setting of these flags is significant, among other things, to the operation of the routine illustrated in FIG. 13 since a change in the set point requires computation of a new effective set point, offset time and advance time. The establishment of a mode change flag is significant to several routines including the implement setback routine and the maintenance of S1 storage temperature.

An interval of change will be regarded as having ended when the space is satisfied and a predetermined time has elapsed.

Living Space Thermal Parameters

The purpose of this routine is to develope a differential number (a delta) which can be used by other routines to decide when and how to condition the living space.

Figure 15:
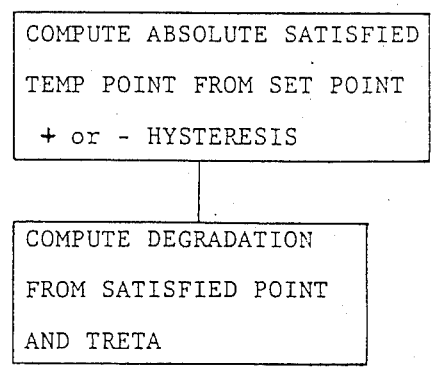

Referring to FIG. 15, a set point temperature is received from HOC 44, as determined by dial 53. A known hysteresis factor is built into the system as a system constant defining band which is ±0.3° F., centered on the set point. A satisfied point is calculated as an absolute number by algebraically combining the set point and the hysteresis constant. This satisfied point is then subtracted from the known, valid, space temperature. The resulting delta figure is stored in a buffer as the output of this routine and is referred to as degradation.

As an example, if the set point is 72° F. in the cooling mode, the satisfied point is 72°−0.3°=71.7°. If TRETA is 74°, the delta is +2.3° which is the degradation and is recognizable by other routines as requiring that the space needs conditioning. The degradation can be positive or negative. A limit on the degradation can be imposed.

Storage Thermal Parameters

Figure 16:
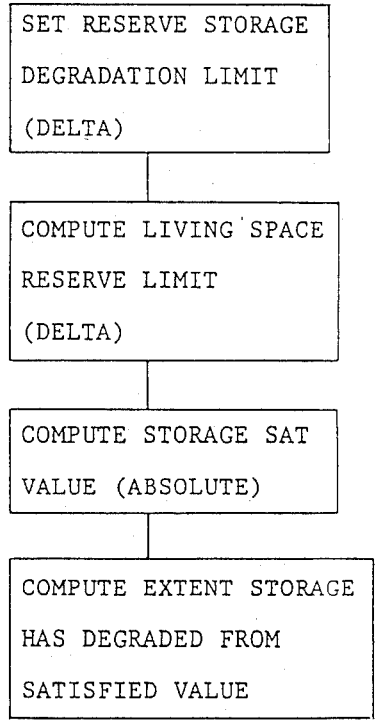

The system of the present invention allows the storage to degrade when the space is in a condition which can be regarded as "super-satisfied" for several starts of fan 34. As previously indicated, since there is no thermostat in the usual sense, fan 34 is operated from time to time and a return air measurement is made. If the system is calling for heat and the set point of dial 53 is 70° with no offset, and if several successive return air measurements indicate a temperature of 75° at each of those measurements, it is apparent that additional heat input from the system is quite unnecessary and probably will be for some time. Under these conditions, it is possible to use the routine of FIG. 16 to set the reserve storage degradation limit at a temperature significantly different from that which will be used if additional heat is called for at every fan start. In addition, there is a reserve of heat in the living space itself which can be calculated. It is possible to determine how much reserve heat is available at the maximum degradation allowable in the storage container, taking into account how much reserve will be necessary in the future. On the basis of this information, a storage satisfied value can be computed and it is then possible to compute how much the storage tank has degraded from the satisfied value. The satisfied value would normally be a temperature of, for example, 48° F. for cooling purposes and 93° F. for heating purposes. Assuming that the homeowner is not paying particular attention to the system during the transitional seasons and allows the mode switch to remain in the heating position in late spring when the outdoor temperature has reached a mild level of, for example, 70° F., the increased allowable degradation prevents the system from being used unnecessarily to maintain the temperature of tank S1 at a high level. This also can anticipate the potential change of the mode switch from heating to cooling, preventing the necessity of heating the storage tank and then having to cool the tank in a relatively short interval of time.

Appliance Demand Parameters

Figure 17:
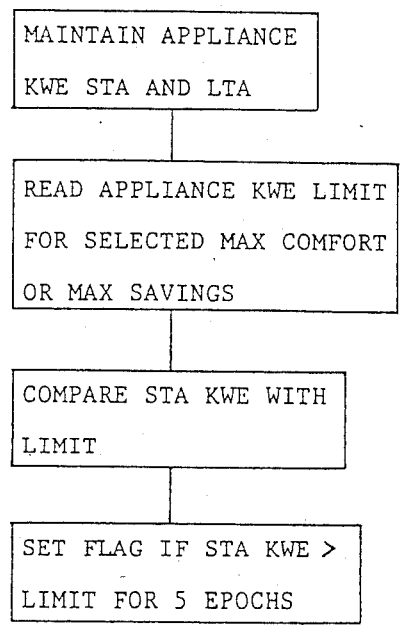
Figure 19:
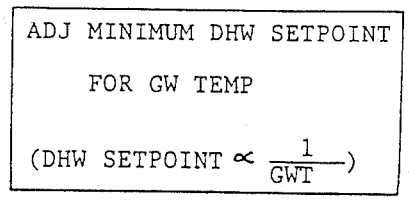

As was previously mentioned, HOC 44 includes a potentiometer, not visible in FIG. 2 and not associated with a homeowner operated dial, by which an appliance demand level or usage level can be established. The routine illustrated in FIG. 17 maintains short and long term averages of the household energy used, reads the appliance limit established in HOC 44, compares the short term average with the limit and sets a flag if the short term average is greater than the limit for five successive epochs. It should be noted that it is possible to set two limits, one for maximum comfort and the other for "normal" or maximum savings, and the homeowner can select these by movement of switch 72. It is the short term average KWE usage which is compared with the selected one of the values. Setting the flag at the conclusion of this routine will result in the next message to HOC 44 including an instruction to illuminate the "appliances" light 67.

Compressor Demand Parameters

Figure 18:
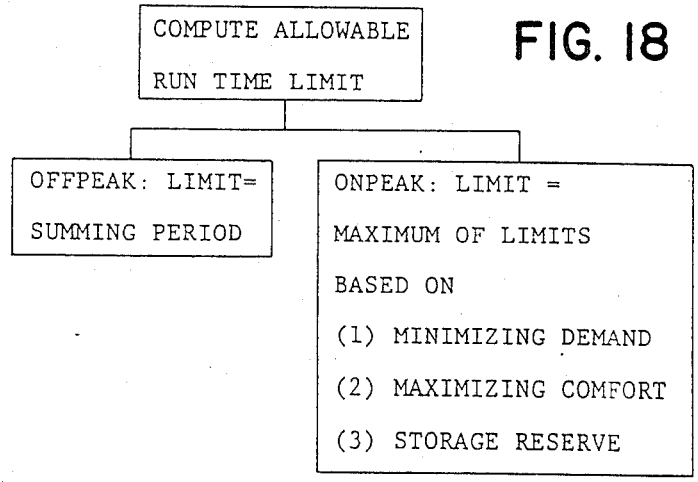
Figure 23:
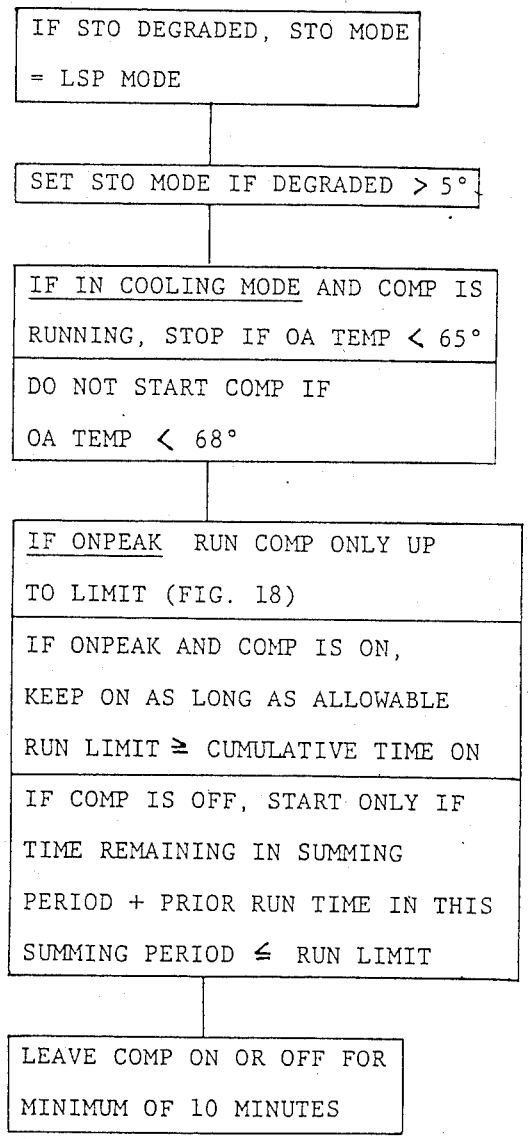

The allowable run time limit of the compressor is computed as illustrated in FIG. 18 by selecting different limits on the basis of whether the time is on or off peak. It should be mentioned that the compressor always has a minimum run time of, for example, 10 minutes which is established to prevent damage to the compressor by cycling on and off (FIG. 23). The maximum is established during the off-peak interval by using the summing period. During on-peak, the limit is established by the maximum of the limit based on minimizing demand, maximizing comfort or on the storage reserve, the selection of these being affected by the position of switch 72.

Storage Resistance Element Run Limit

The purpose of this routine is to establish conditions under which the resistive element, referred to as "I2R" should not be operated. The routine does not appear to require illustration. A flag is set, indicating that the resistive element 40 in storage tank S1 should not be energized when the system is in the cooling mode; if fan 34 is de-energized or has been energized for less than 10 minutes; or if the space temperature is moving toward a satisfied condition and the system is not in a setback.

DHW Set Points

The purpose of this routine is to establish temperature set points which will be regarded as satisfied conditions for the domestic hot water storage tank S2. The basic setting is determined as a function of the ground water temperature and the setting of dial 78 on HOC 44. Most hot water usage takes place by mixing some hot water from the storage tank with ground water. The lower the temperature of the ground water, the more hot water from the storage tank must be used to reach a desired mixed water temperature. Thus, if the ground water temperature is high, the domestic hot water need not be heated to as high a level and energy can be conserved. The range of DHW set point temperatures is preferably between about 110° F. and 150° F.

If the outdoor temperature is such that the compressor is not run to either heat or cool the residence, thereby not heating the domestic hot water supply, a seprate routine can be used to heat the DHW using the resistive element 42.

Determine the Space Fan Minimum Off Times

Figure 20:
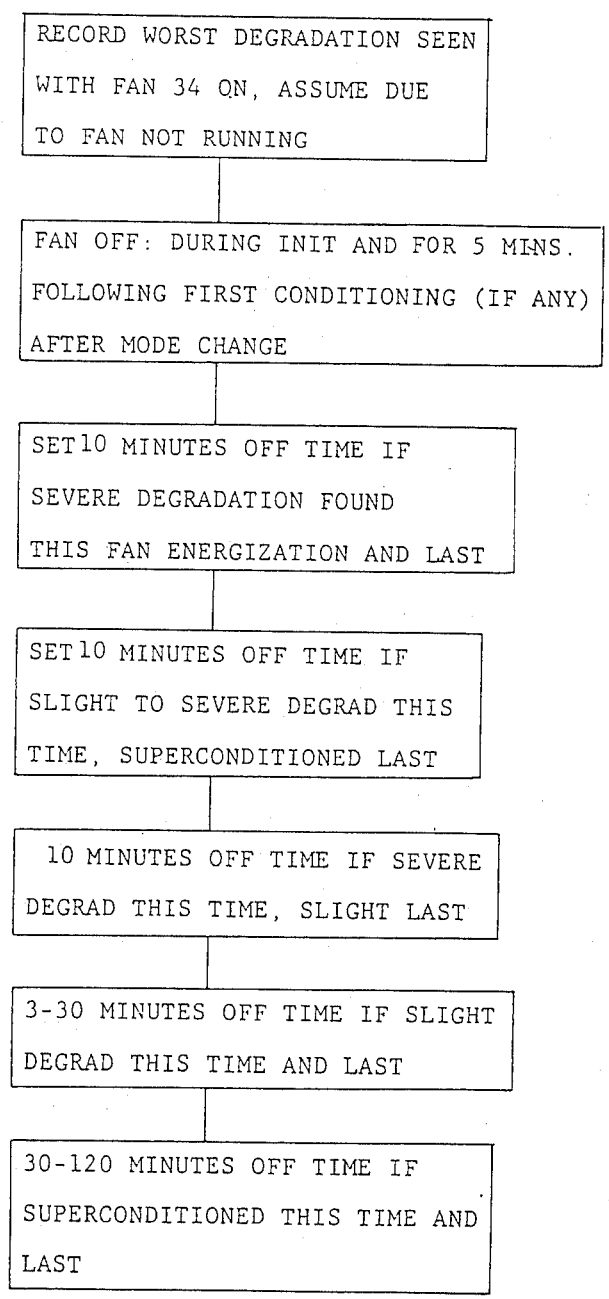

FIG. 20 illustrates the conditions which are used by this routine to determine the length of time fan 34 is allowed to remain off. As previously mentioned, fan 34 must be running in order for the system to obtain a valid temperature reading for the space being controlled. Thus, it is necessary to turn the fan on from time to time and "take a look" at the condition of the space. However, if the outside temperature is 70°, the set point temperature is 70° and there are no other unusual conditions, the space is obviously not going to need either heating or cooling and it would be energy inefficient to turn the fan on every few minutes just to see what the temperature is. Thus, one purpose of this routine is to examine the circumstances and operate the fan at longer intervals the more the space is satisfied, as well as to control fan operation in response to other conditions.

Thus, the fan remains off during initialization to allow the system to go through the various initialization and stabilizing processes without interference. In addition, the fan remains off for 5 minutes after the first conditioning of the living space, if any was needed, following a change in the position of mode switch 48.

If there was severe degradation of the living space temperature from the set point temperature during the current energization of fan 34 and also severe degradation during the previous energization, the fan off interval is set at 10 minutes. Throughout this routine, 3 minutes is used as a minimum off time. However, if the current energization indicates that the temperature of the space has undergone slight to severe degradation this time but that the space was super-conditioned the previous time, the off time is set at 10 minutes. If the degradation this time is severe but only slight the previous time, 10 minutes is set. If a slight degradation occurs in two successive energizations, an interval from 3 to 30 minutes is set, and if the space was super-conditioned in two successive energizations, an interval between 30 and 120 minutes is set. The selection of a time within these intervals is essentially a linear function of the fan off time the last time and the amount of degradation which has occurred. It will be observed that, unless the system is turned off, the fan will operate at least every 120 minutes. This is considered necessary to accommodate sudden changes in weather and changes which occur in outside temperature as the day progresses, but also to provide a minimum degree of air circulation.

Investigate Living Space Temperature

Figure 21:
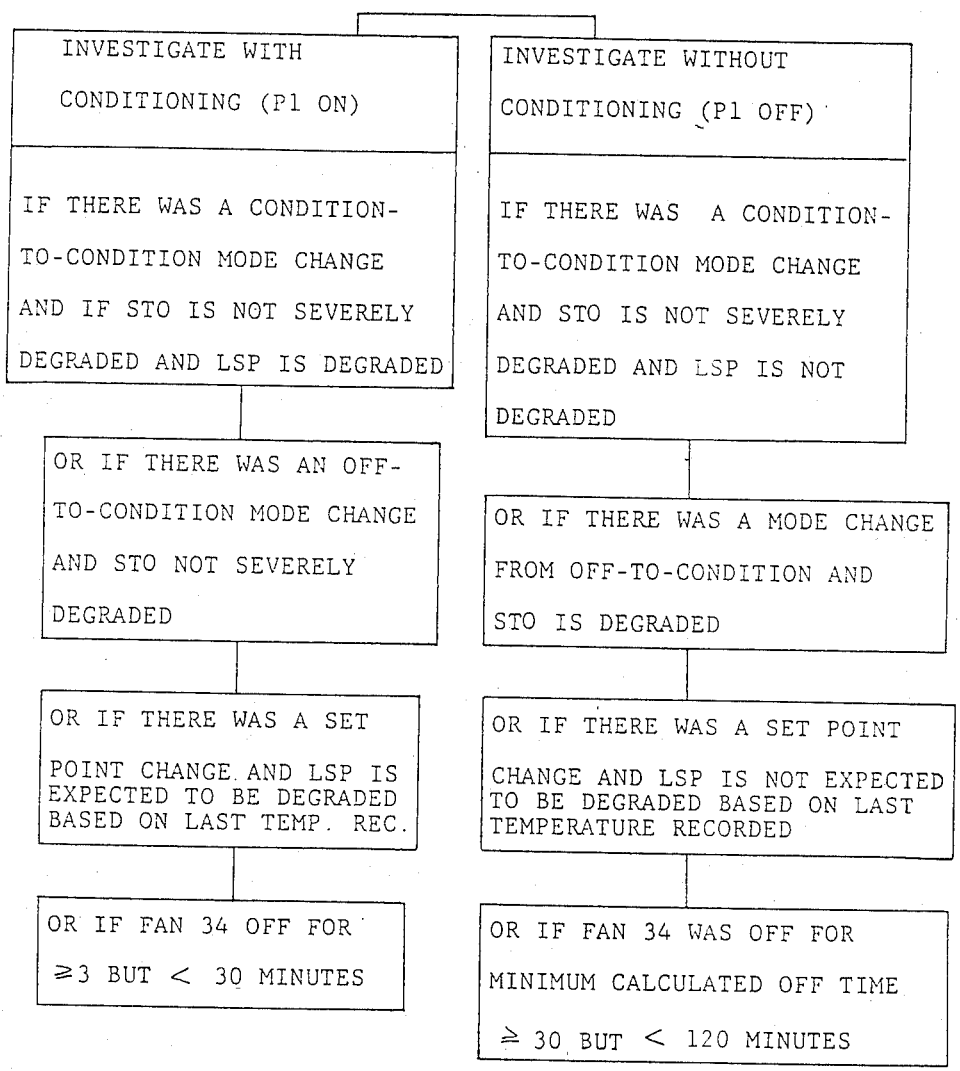

In connection with FIG. 20, the routine of FIG. 21 illustrates the manner in which the temperature of the living space is investigated. Turning again to FIG. 1, it will be recognized that fan 34 can be operated either with or without space conditioning, i.e., either with or without energization of pump P1. The investigation is done with conditioning if there has been a change in the position of mode switch 48 either from heating to cooling or from cooling to heating and if the living space temperature has degraded but the storage temperature is not severely degraded. It should be noted that this set of conditions is particularly important if the system has been operating, for example, in a heating mode for a substantial amount of time and the temperature in tank S1 is relatively high to permit the system to heat the space and, then, the switch is moved to the cooling mode. Obviously tank S1 could not be at a suitably cool temperature to permit conditioning of the space in a cooling mode. Thus, the investigation under those circumstances would not be done with conditioning.

If the mode change was from off to either heating or cooling and if the storage is not severely degraded, the investigation is done with conditioning. Similarly, if there was a set point change and the living space is expected to be degraded based on the last temperature (TRETA) recorded, the investigation will be done with conditioning. Finally, if the fan has been off for thirty minutes or more but less than 120 minutes, the investigation will be done with conditioning.

The investigation will be done without conditioning if there was a condition-to-condition mode change and the storage is not severely degraded but the space is also not degraded or if the mode change was from off to a conditioning position and the storage is degraded. If there was a set point change but the living space is not expected to be degraded based on the last TRETA recorded, then the investigation will be done without conditioning. Finally, if the fan 34 was off for the minimum calculated time of 30 minutes or more but less than 120 minutes, conditioning will not be used. It is apparent in order to conserve energy that conditioning should not be used except when necessary.

Condition Living Space

Figure 22:
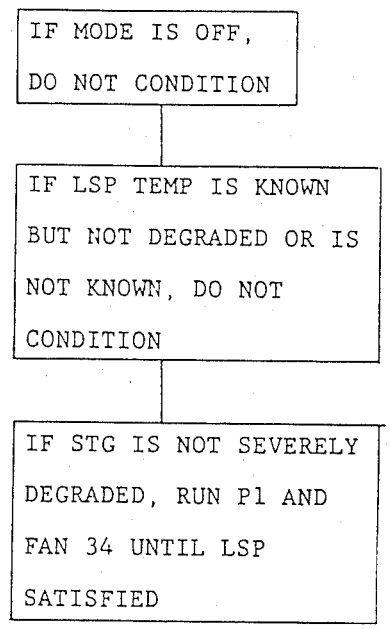

The routine of FIG. 22 determines the fundamental circumstances under which the space will or will not be conditioned. As illustrated, the space will not be conditioned if the mode switch 48 is in the off position and no conditioning will occur if the living space temperature is not known or is known but is not degraded from the set point. If neither of those negative conditions exist, and if the temperature of storage tank S1 is not severely degraded, pump P1 and fan 34 are operated until the living space temperature is satisfied. It should be mentioned that "satisfied" is defined in this sytem as the set point temperature plus or minus 0.3°. Thus, in the heating mode, a satisfied condition for a set point of 70° is 70.3° and in the cooling mode a satisfied condition for the same set point is 69.7°.

Run Fan Only

A routine which needs no illustration is one to operate the fan only in response to switch 49 being in the "on" position. If the system is operating in a normal epoch and the message from HOC 44 to the controller includes the fan only component, the fan will be operated. However, if the outside air temperature is less than 32° and the system is attempting to condition storage S1, the fan will be stopped. As with the other modules, a positive flag is set by this routine if the conditions are met for fan operation.

Condition Storage With Compressor

This routine deals with the circumstances under which storage tank S1 is conditioned using the compressor. A fundamental statement in the routine illustrated in FIG. 23 is that if the storage is degraded, the storage mode is the same as the living space mode. The storage mode is not set, i.e., the storage tank is not regarded as requiring conditioning, until the temperature of the water in the tank is degraded from the storage tank set point by more than 5 degrees.

When conditioning the storage tank for cooling of the living space, it is necessary to be concerned about inducing freezing conditions in the heat exchanger. Thus, if the system is in the cooling mode and the compressor is running, the compressor will be stopped if the outside temperature is less than 65° unless the compressor has been on for less than 10 minutes in which case it will be allowed to complete that 10 minute interval. The compressor will not be started if the outside air temperature is less than 68° when the system is in the cooling mode.

Additionally, if the time is during the peak intervals, the compressor will only be run up to the limit as determined by the previously discussed compressor demand parameters routine (FIG. 18) but it will be kept on as long as the allowable run time is greater than the cumulative time on in this summing period. Furthermore, the compressor will be started only if the time remaining in the summing period added to the running time, if any, which has already occurred in this summing period is less than or equal to the run limit. The summing period is that 0.5 hour interval used in determining the peak demand as would occur under an integrating-type demand rate structure.

Allowable run time is constantly being recalculated (FIG. 18) as a function of electrical loads being turned on and off in the household, other than HVAC components. It is desirable to minimize the number of starts of the compressor and it is also desirable to straddle the beginnings and ends of summing periods with an energized compressor. Taking these considerations together permits the condition that the compressor will be allowed to reenergize if, during on-peak, the calculated allowable run time is greater than the sum of the previous cumulative run time in this summing period plus the remaining time in this summing period.

Again, the compressor will always be allowed to run for a minimum of 10 minutes once it has been started, or will be allowed to remain not running for a minimum of 10 minutes, regardless of other requirements imposed by the conditioning needs of the system.

Check Frost

Figure 24:
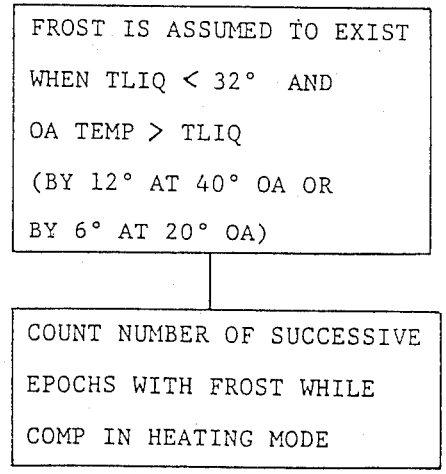

The purpose of the algorithm (FIG. 24) is to establish criteria for determining the existence of frost on the outside air coil and to record the length of time that frost has existed. The number of successive epochs during which frost conditions exist is counted and the count is maintained for future reference. Frost is assumed to exist when the liquid temperature in coil 10 is less than 32° and when the outside air temperature is much greater than the liquid temperature. For purposes of this module, the term "much greater" means 12° at 40° outside air temperature or 6° at 20° outside air temperature, all in degrees F. A graph of the difference (OA-TLIQ) outdoor ambient temperature plotted against the difference is a parabolic curve. However, this can be approximated using a linear function in which the difference is 12° at 40° outside air and 6° at 20° outside air.

Defrost

Figure 25:
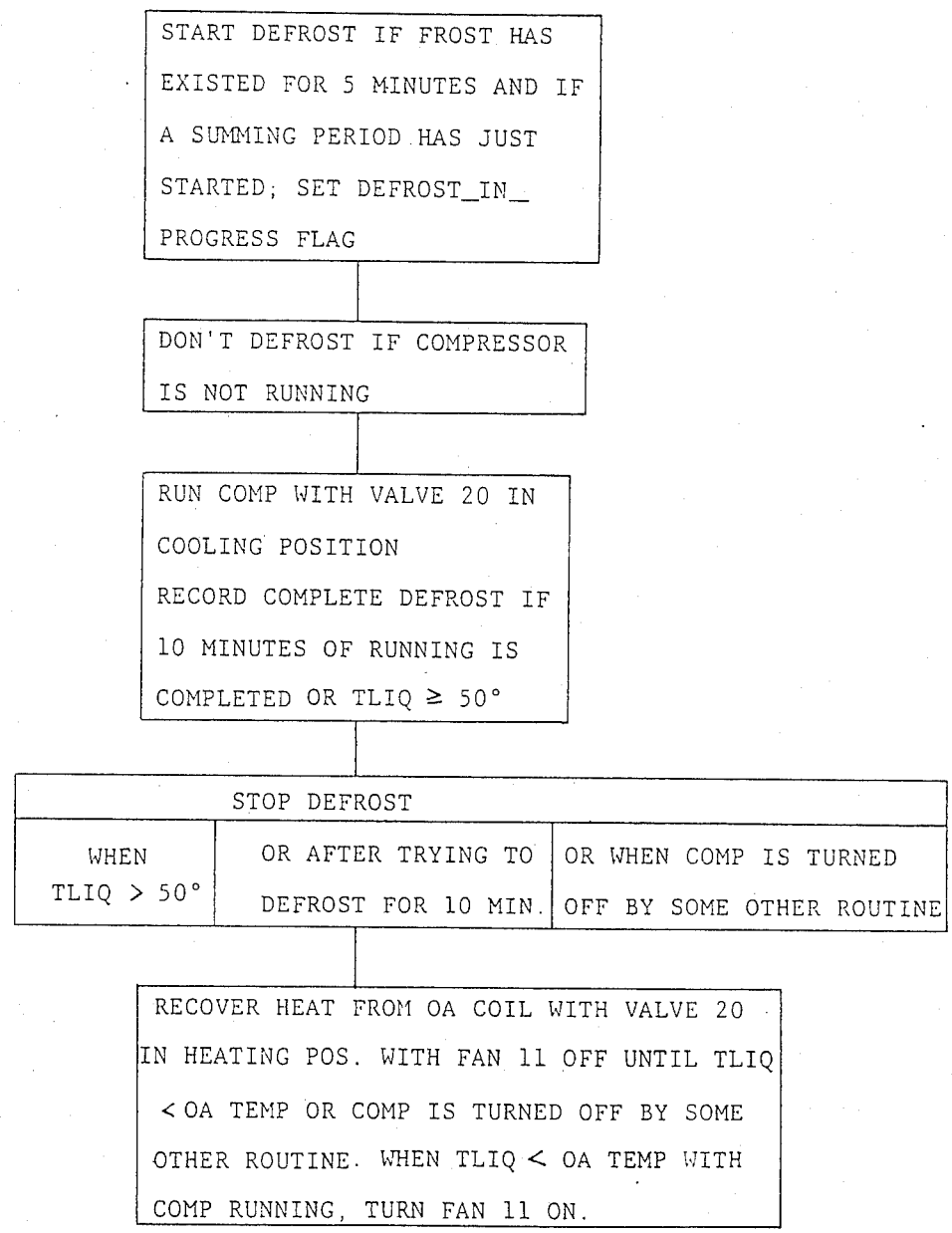

After the existence of frost has been detected, it is necessary to remove it. The criteria and procedure for doing so is illustrated in FIG. 25. Defrost is started if the check frost routine has determined that frost has existed for 5 minutes and if a summing period has just started. Defrost is not commenced if the compressor is not running. In order to defrost, the compressor is run with reversing valve 20 in the cooling position and the defrost is terminated when the liquid temperature goes above 50° or after the defrost effort has been going on for 10 minutes or when the compressor is turned off by some other algorithm in the system. A complete defrost is recorded if 10 minutes of defrost position running is completed or if the liquid temperature reaches 50° F. Heat is then recovered from the coil with the reversing valve 20 in the heating position and the outside fan 11 de-energized until the liquid temperature is less than the ambient temperature or until the compressor is turned off by some other algorithm. When TLIQ becomes less than the outdoor temperature with the compressor running, fan 11 is turned on again.

Prevent Freeze

Figure 26:
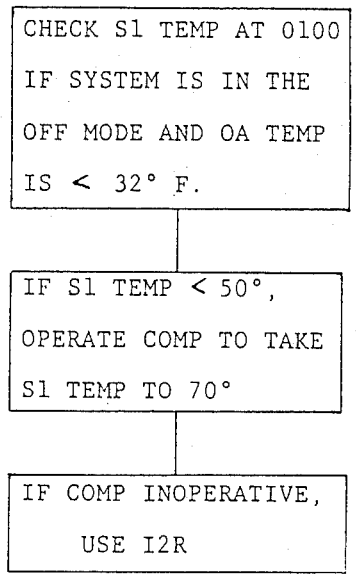

It is theoretically possible for the storage tank S1 to freeze if the system is placed in the off mode during the winter and if the residence is unoccupied for a length of time and the outside temperature falls. This must be prevented because of the damage which would be done by a split water tank containing 120 gallons of water. The algorithm of FIG. 26 checks the temperature of S1 at 1:00 in the morning if the system is in the off mode and the outdoor air temperature is less than 32° F. If the S1 temperature is less than 50°, a flag is set to operate the compressor to take S1 to 70°. In the event that the compressor is inoperative for any reason, the resistive heating elements are used for the same purpose.

Keep Storage Current

The storage temperature information needs to be available from the outset in order to operate various other algorithms in a meaningful fashion. When the system is first started, or restarted after a period of having been shut down, it is necessary to determine this storage temperature. Accordingly, this algorithm, which is not separately illustrated, involves running pump P1 for an interval of 5 minutes during the initialization epoch and at a time when the ampere calibration is not being accomplished, the purpose of that being to avoid interfering with the on-off cycling which occurs during that calibration process. After 5 minutes of operation of the pump, the temperature can be reliably read by sensor D. Also, the value of the storage temperature becomes invalid after two hours of pump P1 not having been run if the mode switch is in heat or cool. At that point, pump P1 is energized to obtain a valid temperature.

Turn On Storage Resistance Heating

Figure 27:
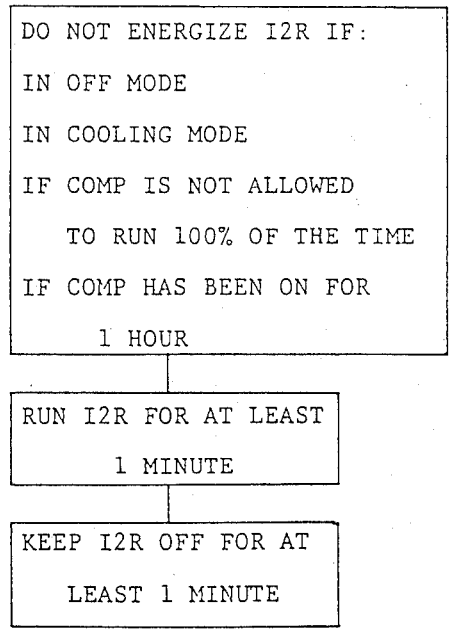

The criteria set forth in FIG. 27 are those which are used by this module to control the energization of the storage resistance heating (I2R). An energization flag will be prevented if the system is in the off or the cooling mode, if the compressor is not being allowed to run 100% of the time, or if the compressor has been on for less than one hour. If it is operated, the resistance heating element will be energized for at least one minute, and once de-energized, will be kept off for at least one minute. It should be emphasized that the elements referred to in this routine are elements 40 in storage vessel S1.

Determine DHW Temperature

Figure 28:
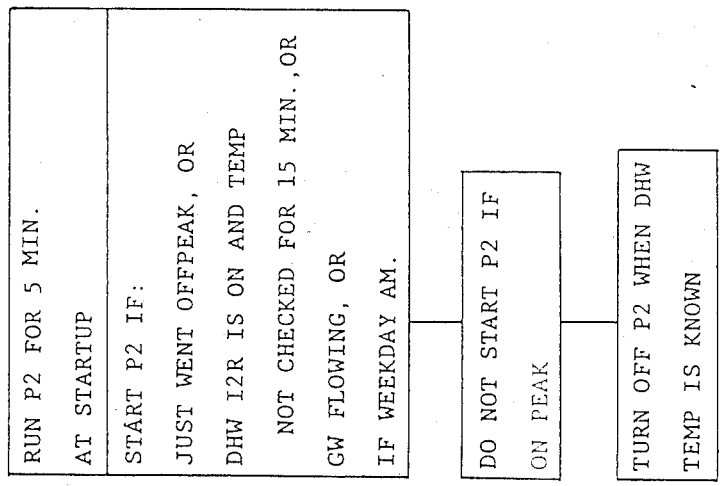

For reasons discussed above in connection with the storage container S1, it is necessary to know the domestic hot water temperature, i.e., the water in tank S2. For this purpose, as shown in FIG. 28, pump P2 is operated and water is circulated through P2, S2, pipe 36 and the water side of exchanger HX-2. Pump P2 is not started during on-peak intervals for purposes of obtaining a DHW temperature, but it is started if the system has just gone offpeak, or if the resistance heating element 42 is on and the temperature has not been checked for the last 15 minutes, or if ground water is flowing or if it is a weekday morning, i.e., an interval at which high hot water usage can be expected. For purposes of this routine, this is established as meaning 3 hours before an off-to-on peak transition.

Pump P2 is turned off as soon as a reliable DHW temperature measurement has been acquired.

Turn on DHW I2R

Figure 29:
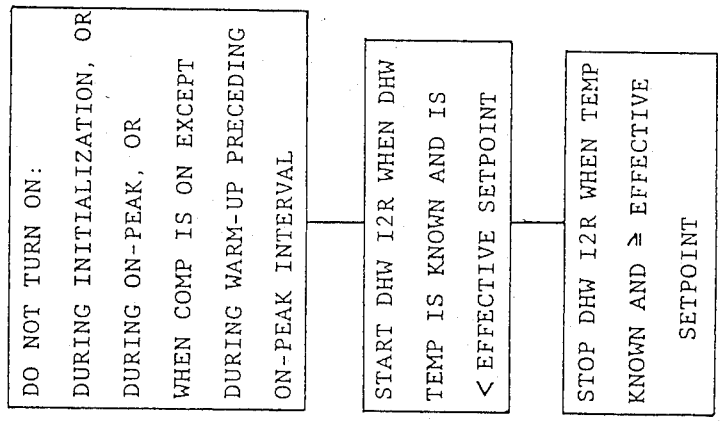

The domestic hot water heating element 42 is energized only when it is absolutely necessary to increase the temperature of the domestic hot water in order to satisfy the needs of the homeowner and its use is avoided whenever possible because it draws a high level of current and increases the operating cost of the system. Accordingly, the routine illustrated in FIG. 29 for following the desirable criteria to actuate the resistance heater sets a flag to start the unit when the domestic hot water temperature is known and is less than an effective set point, i.e., less than a temperature which has been determined to be necessary for purposes of satisfying the domestic needs. However, the element is not turned on during the initialization period or during on-peak times and is also not turned on when the compressor is operating except if both the compressor and the resistive heating elements appear to be necessary to elevate the domestic hot water temperature to a desired level in the time remaining before the on-peak interval commences. The element is turned off when the temperature is known and is equal to or greater than the effective set point. It will be recognized that the temperature may not be known at the time it passes through the set point temperature because of the 15 minute delay inherent in the routine of FIG. 28.

Heat DHW With Compressor

The operation of the compressor for purposes of heating domestic hot water is substantially independent of the resistance heater. Pump P2 is run to extract super heat through HX-2 from the compressor, but the pump is only energized when the compressor is running. Because of the relative economy of heating domestic hot water with the compressor as compared with the resistive elements, it is desirable to allow the compressor to run until the DHW temperature is at a higher level than the upper limit which is used with the resistive elements. Because of the simplicity of this it is not separately illustrated.

Compressor Control Failure

Figure 30:
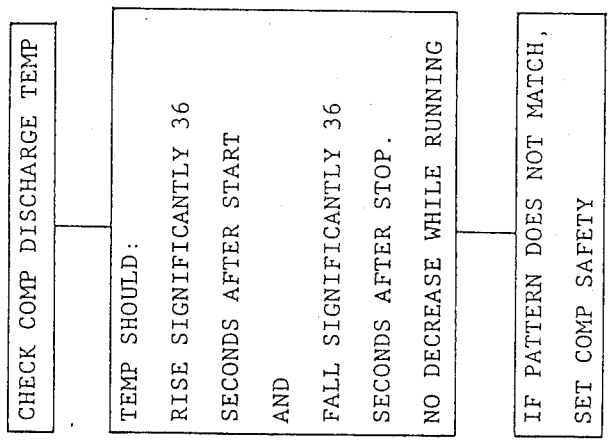

One of the most vulnerable parts of the system, from a mechanical point of view, is always the compressor. Accordingly, it is desirable to check the compressor to be sure that it is operating properly and, hopefully, to detect performance degradation before a catastrophic failure occurs. If the compressor is operating properly, the discharge temperature of the compressor should rise significantly, i.e., by about 15° in about 36 seconds after the compressor starts and should fall significantly about 36 seconds after the compressor stops. Furthermore, the temperature should not decrease while the compressor is running. The routine illustrated in FIG. 30 maintains a record of the compressor discharge temperature for the last 15 epochs and compares the latest reading with one from 9 epochs earlier to see if a change between those epochs occurred and, if so, to be sure that these temperature changes occurred in the proper direction. If this desired pattern is not followed, a flag is set which is a compressor safety flag which causes the compressor to be disabled. In addition, the flag will result in illumination of service light 65 on HOC 44.

Outside Air Fan Control Failure

Figure 31:
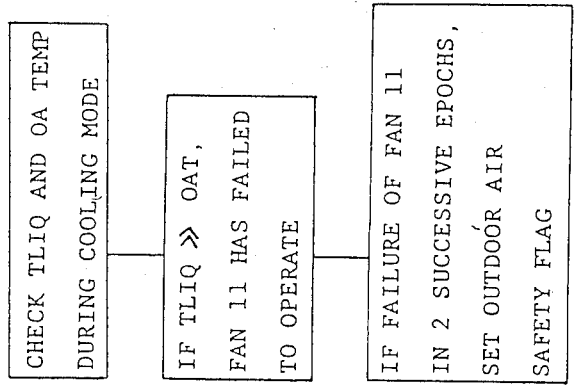

The criteria for this routine are illustrated in FIG. 31. The temperature of the liquid at location D is checked and also the outside air temperature at location G. If the liquid temperature is much greater than the outside air temperature during cooling, it is apparent that fan 11 is not operating properly. If fan 11 fails to operate in two successive epochs, an outdoor air safety flag is set. This will ultimately result in the illumination of the service light 65 on HOC 44.

Monitor Reversing Valve

Proper operation of the reversing valve 20 can be monitored by checking the liquid temperature and the ambient air temperature and comparing these values. The criteria for checking valve operation are shown in FIG. 32. If, during the cooling mode, the ambient temperature is greater than the temperature of the liquid for a relatively long interval of time, such as about 8 minutes, it can be assumed that the reversing valve is not operating properly and a reversing valve safety flag is set. Similarly, during the heating mode, if the liquid temperature is greater than the ambient temperature for about 8 minutes a reversing valve safety flag is set.

This routine is disabled during defrost. A "defrost in progress" flag is set by the routine in FIG. 25 which is recognized for this purpose.

Monitor Power

This routine, which is not separately illustrated, monitors the voltage continuously and disables the system if it detects a high voltage for one minure or if a low voltage for one minute. The system is not reactivated until the voltage is within an acceptable range for 10 minutes. For purposes of this routine, an acceptable range is between 102 and 138 volts.

Monitor Freeze Status

Figure 34:
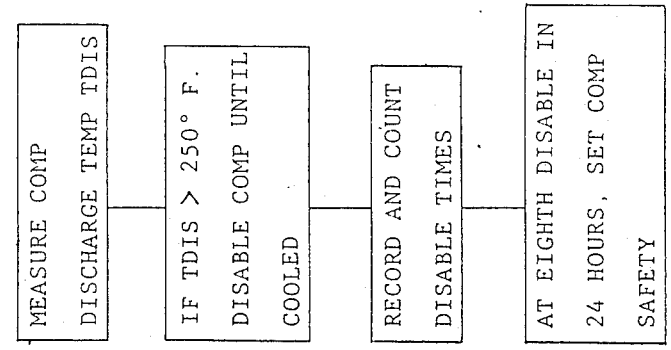

Under some conditions, it is possible for exchanger HX-1 to freeze which essentially precludes proper operation of the system. Accordingly, in the routine illustrated in FIG. 34, the temperature at sensor D is measured. If in the cooling mode the temperature at sensor D is less than, e.g., 25° for 30 seconds, an HX-1 freeze flag is set. Also, in the heating mode during defrost, if the S1 temperature is less than 50° for one epoch, the HX-1 freeze flag is set.

Monitor TDIS

The discharge temperature of the compressor is monitored to detect the existence of an excessively high temperature. When a high temperature is detected, the compressor is disabled along with the associated devices until the temperature at sensor C drops to, e.g., 180° at which time the compressor is re-energized. A record is kept of each such disablement during a 24-hour period and the system will permit the compressor to be disabled as many as 7 times during that period. However, if the temperature goes too high an eighth time as illustrated in FIG. 35, a hard safety is set and the compressor cannot be re-energized.

Reduction

Figure 35:
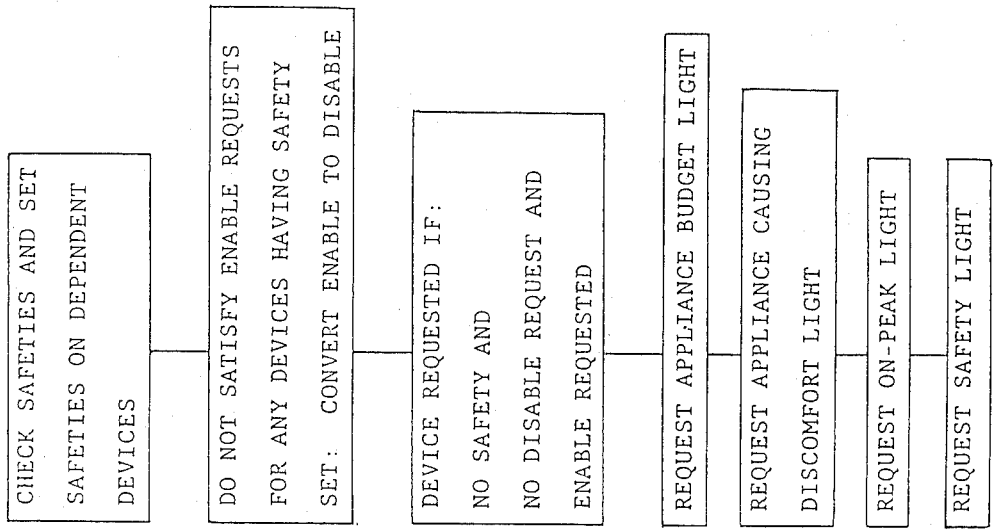

The ultimate purpose of the routine shown in FIG. 35 is to generate a word in digital code which is, essentially, a summary of the various requests and conditions resulting from flags set or not set by the routines discussed above. In producing this word, the routine acts as a screen to sort out enable and disable requests or flags which might be inconsistent with each other and establishes an unambiguous relationship which can be satisfied by the system and which is appropriate to the circumstances.

A first step in the routine is to look for any "safeties" which have been requested and to determine what other devices are dependent on a device for which a safety has been requested. For this purpose, a table of dependencies is stored in non-volatile memory. This table simply sets out which devices are dependent on each device for which a safety can be set. For example, devices dependent on pump P1 are the compressor, the outdoor air fan and the reversing valve because none of those devices should be allowed to operate if P1 cannot. Safeties are set on any devices dependent on a device which has a safety set on it.

It follows that enable requests for devices with safeties set should not be satisfied. Such requests are converted to disable requests. A device request is then screened and it is concluded that energization of a device is requested if there is no safety on that device and no disable requested and if there is an enable request for it. It should be noted that this is a priority sequence in addition to being necessary conditions.

The last portions involve requests for the lights as shown in FIG. 35 if the flags requesting the conditions exist. It should be noted in connection with the safety and disable requests discussed above that a safety on a device means that the device cannot be restarted without shutting down and re-energizing the system. A disable is simply a request to de-energize.

Sequencer

Figure 36:
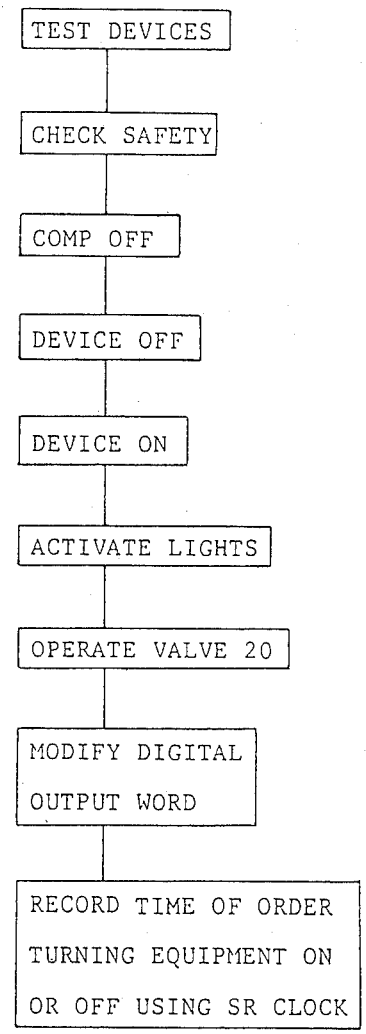

FIG. 36 illustrates the order in which actions are taken on the basis of the screening accomplished by the Reduction routine. Device tests are accomplished at the beginning and safeties are checked. If any safeties are found, the device involved is de-energized and the routine is not continued further.

In the order of actions, the compressor is de-energized first, if a request to do so has been received, then other "device OFF" requests are honored. After that, devices are energized in a specified order after which requested lights are energized and, if suitable, valve 20 is switched. "ON" requests are OK'd together to modify the digital output word. Finally, the time at which devices are turned on or off are recorded in terms of the start relative clock.

It is believed that the operation of the system will be clear from the above but the following will summarize the overall scheme. When the system is first energized, the values which are initially needed are stored and calculated as described in connection with the initialization routine. The homeowner selects a set point temperature and the offset times and temperatures using the controls on HOC 44. When a message is formulated and sent from PCON 45 to HOC 44, the console responds with a message including the information about the set points and the information summarizing the positions of the other controls.

Meanwhile, all of the temperature measurements are continuously being made and the voltage and current supplied to the residence is being measured. From time to time, as determined by conditions described in connection with FIG. 21, the living space temperature is investigated, with or without conditioning. Storage S1 temperature is examined and conditioned during off-peak times so that it is prepared to supply heat or receive heat from the space during on-peak times with minimum use of the compressor and resistive elements.

Because of the fact that most of the routines are being accomplished concurrently there is no logical manner in which an overall progression of events can be described. It will be appreciated, however, that most of the routines provide and update either a value which is the result of a measurement and calculation, or a flag and that these values and flags are detected, used and, in some cases acted upon by other routines for the ultimate purpose of producing a digital word which, in a predetermined sequence, commands the starting, stopping or continued operation or non-operation of all of the motors and other components of the system. Furthermore, these operations are accomplished in a real time framework defined by 4 second epochs established within the system.

The system can be viewed as performing the space conditioning function in a way which not only heats or cools the space to maintain a desired comfort level in an efficient manner but also performs a demand limiting function. This is of particular importance to the utilities because if an adequate number of residences in a utility region limit their individual power demands to a selected level, the generating plant peak capacity of the utility can be reduced or at least limited. A measure of this is referred to as load factor which is defined as the average load divided by the peak load, each of these being over a selected interval of time, e.g., an hour, a month or a year. Calculating the load factor for a year, for example, would involve integrating the kilowatts produced during the year, i.e., the total kilowatt hours for that year and dividing that by the peak kilowatts produced over an interval of time such as an hour multiplied by 8760, the number of hours in the year. This is a factor commonly used by utilities for various purposes.

The load factor for a conventional HVAC heat pump system is quite often in the order of 0.20 to 0.30, indicating that the peak demand of the system calculated on the basis of a winter peak is very high as compared with the average load. Furthermore, the peaks tend to be weather-responsive and to occur together for groups of dwellings. Thus, the utility serving such a region must have plant capacity to accommodate those peaks or make other arrangements.

With the system of the present invention the peaks are moved, essentially, to times when demand is low. Furthermore, the demand of an individual system is less likely to be synchronized with the demands of a significant number of other systems because the major conditioning of the storage tank S1 can occur at any time during off-peak hours. Thus, the load factor for such a residence rises significantly. Ideally, the load factor should approach 1.0. In a practical system in accordance with the invention, the load factor can be between about 0.70 and 0.80, a very significant improvement over prior systems.

The rate structures established by utilities can be highly variable from one location to another and can change within an area from time to time. For example, a local utility can establish its peak interval for purposes of rate structure as being from 9:00 a.m. to 9:00 p.m. and then later change this to two peak intervals of 7–11:00 a.m. and 4–9:00 p.m. This presents no problem for the present system because it can employ the off-peak intervals to advantage whenever they occur. The beginnings and ends of these intervals are identified by signals sent over the lines to meters installed by the utilities.

The controller can be constructed using dedicated hardware but is most easily implemented using an 8088 microprocessor.

While one advantageous embodiment has been chosen to illustrate the invention, it will be recognized by those skilled in the art that various changes and modifications can be made therein without departing from the invention as defined in the appended claims.

What I claim is:

1. An air-to-water-to-air heat pump system for heating and cooling the interior of a residence comprising the combination of
   a first refrigerant-to-fluid heat exchanger having separate refrigerant and fluid paths therein in heat exchange relationship;
   a second refrigerant-to-water heat exchanger having separate refrigerant and water paths therein in heat exchange relationship;
   a refrigerant circuit including
      a refrigerant-to-air heat exchanger located outside of the residence and having a refrigerant path in heat exchange relationship with ambient air;
      a refrigerant compressor, an expansion device and a four-port reversing valve means;
      first conduit means for connecting said refrigerant path of said refrigerant-to-air heat exchanger, said expansion device and said refrigerant path of said first refrigerant-to-fluid heat exchanger in series relationship between first and second parts of said reversing valve; and
      second conduit means for connecting said compressor and the refrigerant path of said second refrigerant-to-water heat exchanger in series relationship between third and fourth ports of said reversing valve;
   a first fluid circuit including
      a fluid-to-air heat exchanger and a first fluid storage means; and
      third conduit means for connecting said fluid path of said first refrigerant-to-fluid heat exchanger, said first fluid storage means and the fluid path of said fluid-to-air heat exchanger in a closed loop series path; and
   a water circuit including
      a second fluid storage means comprising a water storage tank;
      fourth conduit means for connecting said second tank and the water path of said second refrigerant-to-water heat exchanger in series relationship;
   means for connecting an external water source to said water circuit between said second tank and said second refrigerant-to-water heat exchanger;
   a hot water distribution system connected to said second tank;
   means selectively operable for flowing air through said fluid-to-air heat exchanger and to a plurality of areas in said interior of said residence for conditioning said areas and for returning air from said plurality of areas to said fluid-to-air heat exchanger; and
   means for sensing the temperature of the return air entering said fluid-to-air heat exchanger from said plurality of areas and for controlling the operation of said selectively operable means.

2. A system according to claim 1 wherein the fluid in said first refrigerant-to-fluid heat exchanger is water.

3. A system according to claim 2 wherein said first storage means comprises a first water storage tank.

4. A system according to claim 3 wherein said first fluid circuit further includes a first pump in said residence connected to circulate water between said fluid-to-air heat exchanger and said first water storage tank.

5. A system according to claim 4 wherein said second water circuit includes a second pump in said residence for circulating water through said fourth conduit means.

6. A system according to claim 1 wherein said first conduit means further includes a dryer and a receiver in said series connection.

7. A system according to claim 1 wherein said reversing valve is movable between a cooling position in which the pressure side of said compressor is connected through said second refrigerant-to-water heat exchanger to said refrigerant-to-air heat exchanger and the suction side of said compressor is connected through said accumulator to said first refrigerant-to-water heat exchanger;
   and a heating position in which the pressure side of said compressor is connected through said second refrigerant-to-water heat exchanger to said first refrigerant-to-water heat exchanger and the suction side of said compressor is connected through said accumulator to said refrigerant-to-air heat exchanger.

8. A system according to claim 1 which further includes means for moving air from the interior of said residence across said water-to-air heat exchanger.

9. A system for temperature conditioning a plurality of areas in the interior of a building comprising the combination of
   first and second refrigerant-to-fluid heat exchangers having separate refrigerant and fluid paths therein in heat exchanger relationship with each other;
   a refrigerant circuit including
      a refrigerant-to-air heat exchanger located outside of said building and having a refrigerant path in heat exchange relationship with ambient air;
      a refrigerant compressor and an expansion device;
      first conduit means for connecting said refrigerant path of said refrigerant-to-air heat exchanger, said compressor, said expansion device and said refrigerant paths of said first and second refrigerant-to-fluid heat exchangers in operative series relationship to transfer heat between ambient air and the fluids in said refrigerant-to-fluid heat exchangers;
   a first fluid circuit including
      a fluid-to-air heat exchanger and a first fluid storage tank and
      second conduit means for connecting said fluid path of said first refrigerant-to-fluid heat exchanger, said first storage tank and the fluid path of said fluid-to-air heat exchanger in a closed loop series path;
   a second fluid circuit including
      a second fluid storage tank;
      third conduit means for connecting said second tank and the fluid path of said second refrigerant-to-fluid heat exchanger in series relationship,
   selectively operable means for flowing air across said fluid-to-air heat exchanger to condition said interior of said building and for returning air from said plurality of areas to said fluid-to-air heat exchanger; and
   means for sensing the temperature of the return air entering said fluid-to-air heat exchanger from said plurality of areas and for controlling the operation of said selectively operable means,
   whereby said compressor can be operated to heat the fluid in said second tank and condition the temperature of the fluid in said first tank which can then be used to condition the interior of said building.

* * * * *